US012261652B2

(12) United States Patent
Nihei et al.

(10) Patent No.: US 12,261,652 B2
(45) Date of Patent: Mar. 25, 2025

(54) COMMUNICATION SPEED PREDICTION APPARATUS, COMMUNICATION SPEED PREDICTION METHOD AND RECORDING MEDIUM

(71) Applicant: NEC Corporation, Tokyo (JP)

(72) Inventors: Koichi Nihei, Tokyo (JP); Yuxuan Jiang, Tokyo (JP)

(73) Assignee: NEC CORPORATION, Tokyo (JP)

( * ) Notice: Subject to any disclaimer, the term of this patent is extended or adjusted under 35 U.S.C. 154(b) by 441 days.

(21) Appl. No.: 17/761,264

(22) PCT Filed: Oct. 1, 2019

(86) PCT No.: PCT/JP2019/038735
§ 371 (c)(1),
(2) Date: Mar. 17, 2022

(87) PCT Pub. No.: WO2021/064858
PCT Pub. Date: Apr. 8, 2021

(65) Prior Publication Data
US 2022/0376802 A1 Nov. 24, 2022

(51) Int. Cl.
*H04W 24/08* (2009.01)
*H04B 17/373* (2015.01)
(Continued)

(52) U.S. Cl.
CPC .......... *H04B 17/373* (2015.01); *H04W 4/027* (2013.01); *H04W 24/02* (2013.01); *H04W 24/08* (2013.01); *H04W 84/005* (2013.01)

(58) Field of Classification Search
CPC ..... H04W 24/08; H04W 24/02; H04W 24/00; H04W 24/04; H04W 24/06; H04W 24/10;
(Continued)

(56) References Cited

U.S. PATENT DOCUMENTS 10,582,402 B2 * 3/2020 Oldewurtel ........... H04W 4/029
11,589,251 B2 * 2/2023 Futaki ................. H04L 43/0888
(Continued)

FOREIGN PATENT DOCUMENTS

JP  2008-199381 A  8/2008
JP  2015-111843 A  6/2015
(Continued)

OTHER PUBLICATIONS

International Search Report for PCT Application No. PCT/JP2019/038735, mailed on Dec. 24, 2019.
(Continued)

*Primary Examiner* — Man U Phan

(57) ABSTRACT

A communication speed prediction apparatus (1) includes: a position prediction unit (111) for predicting a future positional relationship between first and second communication apparatuses (B, D); a speed prediction unit (112) for predicting the future communication speed between the first and second communication apparatuses by using a predicted result by the position prediction unit and a prediction model (PD) for predicting the future communication speed between the first and second communication apparatuses; an extraction unit (113) for extracting a training information from an information source (121) including information relating to a past positional relationship between the first and second communication apparatuses and information relating to a past communication speed between the first and second communication apparatuses; a training unit for training a parameter of the prediction model by using the training information; and a model update unit (115) for updating, by using the trained parameter, the prediction model used by the speed prediction unit, the model update unit changes, based on at least one of a state of the communication speed prediction apparatus and a state of the first and second
(Continued)

communication apparatuses, an update frequency by which the prediction model is updated.

23 Claims, 10 Drawing Sheets

(51) Int. Cl.
*H04W 4/02* (2018.01)
*H04W 24/02* (2009.01)
*H04W 84/00* (2009.01)

(58) Field of Classification Search
CPC ......... H04W 28/26; H04W 4/00; H04W 4/02; H04W 4/04; H04W 4/40; H04W 4/44; H04W 4/70; H04W 4/38; H04W 16/18; H04W 64/00; H04L 43/08; H04L 41/12; H04L 41/14; H04L 41/50; H04L 43/50; H04L 29/06; H04L 69/22; H04L 67/12; H04L 12/16; H04L 12/24; H04L 41/16; H04B 17/27; H04B 17/37; H04B 17/39
USPC .......................................................... 370/252
See application file for complete search history.

(56) References Cited

U.S. PATENT DOCUMENTS

| | | | |
|---|---|---|---|
| 11,818,433 B2* | 11/2023 | James | H04N 21/414 |
| 12,034,495 B2* | 7/2024 | Kudo | H04W 24/00 |
| 2014/0357297 A1 | 12/2014 | Futaki | |
| 2015/0304874 A1 | 10/2015 | Oldewurtel | |
| 2019/0215378 A1* | 7/2019 | Munishwar | H04W 36/322 |
| 2021/0345138 A1* | 11/2021 | Vandikas | G06F 18/285 |
| 2022/0022080 A1* | 1/2022 | Futaki | H04L 43/0888 |
| 2022/0078637 A1* | 3/2022 | Tullberg | H04L 67/34 |
| 2022/0190941 A1* | 6/2022 | Kudo | H04B 17/373 |
| 2022/0352995 A1* | 11/2022 | Kudo | H04B 17/27 |
| 2023/0097606 A1* | 3/2023 | Takahashi | H04W 24/08 370/252 |
| 2023/0114810 A1* | 4/2023 | Li | H04L 41/16 370/235 |

FOREIGN PATENT DOCUMENTS

| | | |
|---|---|---|
| JP | 2016-017171 A | 2/2016 |
| JP | 2017-188375 A | 10/2017 |
| JP | 2018-165099 A | 10/2018 |

OTHER PUBLICATIONS

Bo Wei et al., "TRUST : TCP Throughput Prediction Method in Mobile Networks", 2018 IEEE Global Communication Conference, Dec. 2018, pp. 1-6.

Evsen Yanmaz et al., "Achieving Air-Ground Communication in 802.11 Networks with Three-Dimensional Aerial Mobility", 2013 Proceeding IEEE INFOCOM, pp. 120-124, Apr. 2013.

M.Mirza et al., "A machine learning approach to TCP throughput prediction", in ACM SIGMETRICS Perf. Eval. Rev., vol. 35, No. 1, pp. 97-108, 2007.

Y.Liu et al., "An empirical study of throughput prediction in mobile data networks", Proc. IEEE Blobal Commun. Conf. (GLOBECOM), pp. 1-6, 2015.

H.Yoshida et al., "Constructing Stochastic model of TCP throughput on basis of stationarity analysis", in Proc. IEEE Blobal Commun. Conf. (GLOVECOM), pp. 1544-1550, 2013.

M.Asadpour et al., "Route or carry: Motion-driven packet forwarding in microaerial vehicle networks", IEEE Trans. Mobile Comput., vol. 16, No. 3, pp. 843-856, 2016.

* cited by examiner

| TIME | POSITION DATA | SPEED DATA |
|---|---|---|
| t | $x_t$ | $y_t$ |
| t-D | $x_{t-D}$ | $y_{t-1}$ |
| t-2D | $x_{t-2D}$ | $y_{t-2D}$ |
| . . | . . | . . |
| t-MD | $x_{t-MD}$ | $y_{t-MD}$ |

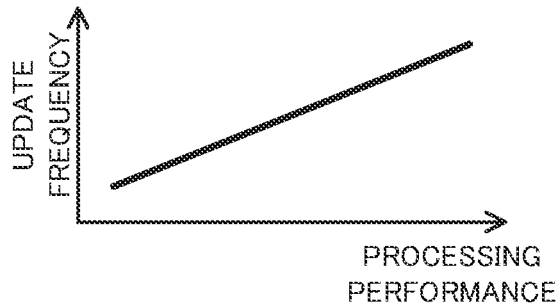 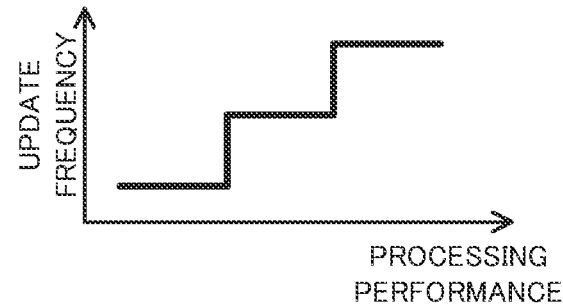
FIG. 10A  FIG. 10B
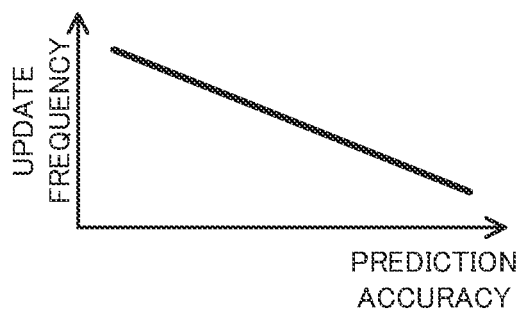 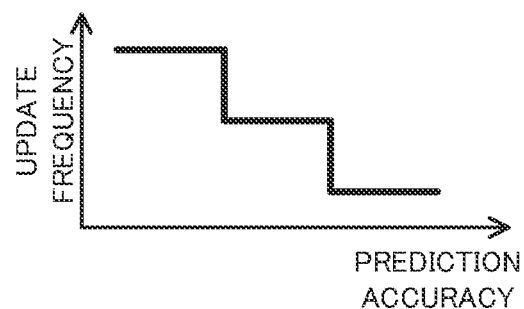
FIG. 11A  FIG. 11B
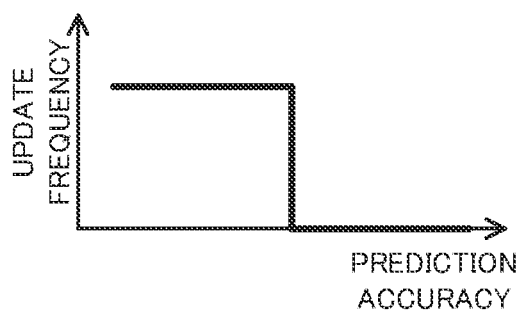 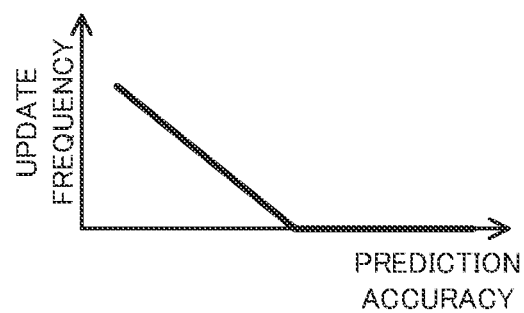
FIG. 11C  FIG. 11D

COMMUNICATION SPEED PREDICTION APPARATUS, COMMUNICATION SPEED PREDICTION METHOD AND RECORDING MEDIUM

This application is a National Stage Entry of PCT/JP2019/038735 filed on Oct. 1, 2019, the contents of all of which are incorporated herein by reference, in their entirety.

TECHNICAL FIELD

The present invention relates to a technical field of a communication speed prediction apparatus, a communication speed prediction method and a recording medium for predicting a future communication speed between first and second communication apparatuses that are configured to communicate with each other.

BACKGROUND ART

A Non-Patent Literature 1 discloses one example of a communication speed prediction apparatus for predicting a future communication speed between first and second communication apparatuses that are configured to communicate with each other. The Non-Patent Literature 1 discloses a communication speed prediction apparatus that predicts a communication throughput at a TCP (Transmission Control Protocol) layer by using a neural network.

In addition, there are Patent Literatures 1 to 4 and a Non-Patent Literature 2 as a background art document relating to the present invention.

CITATION LIST

Patent Literature

Patent Literature 1: JP2018-165099A
Patent Literature 2: JP2016-017171A
Patent Literature 3: JP2017-188375A

Non-Patent Literature

Non-Patent Literature 1: Bo Wei et al., "TRUST: TCP Throughput Prediction Method in Mobile Networks", 2018 IEEE Global Communication Conference, December 2018
Non-Patent Literature 2: Evsen Yanmaz et al., "Achieving Air-Ground Communication in 802.11 Networks with Three-Dimensional Aerial Mobility", 2013 Proceeding IEEE INFOCOM, pp. 120-124, April 2013

SUMMARY OF INVENTION

Technical Problem

The communication speed prediction apparatus disclosed in the Non-Patent Literature 1 has such a technical problem that there is a room for improvement for properly updating a prediction model (for example, a neural network) that is used to predict the communication speed.

It is therefore an example object of the present invention to provide a communication speed prediction apparatus, a communication speed prediction method and a recording medium that can solve the technical problems described above. As one example, the example object of the present invention is to provide a communication speed prediction apparatus, a communication speed prediction method and a recording medium that are configured to properly update the prediction model that is used to predict the communication speed.

Solution to Problem

A first example aspect of a communication speed prediction apparatus is a communication speed prediction apparatus configured to predict a future communication speed between a first communication apparatus and a second communication apparatus that is capable of relatively move to the first communication apparatus, the communication speed prediction apparatus includes: a position prediction unit configured to predict a future relative positional relationship between the first and second communication apparatuses; a speed prediction unit configured to predict the future communication speed between the first and second communication apparatuses by using a predicted result by the position prediction unit and a prediction model that is for predicting the future communication speed between the first and second communication apparatuses based on the relative positional relationship between the first and second communication apparatuses; an extraction unit configured to extract, from an information source that includes a plurality of sample information in each of which a past position information relating to a past relative positional relationship between the first and second communication apparatuses is associated with a past speed information relating to a past communication speed between the first and second communication apparatuses, at least one sample information as a training information for training the prediction model; a training unit configured to train a parameter of the prediction model by using the training information; and a model update unit configured to update, by using the parameter trained by the training unit, the prediction model used by the speed prediction unit, the model update unit is configured to change, based on at least one of a state of the communication speed prediction apparatus and a state of the first and second communication apparatuses, an update frequency by which the prediction model is updated.

A second example aspect of a communication speed prediction apparatus is a communication speed prediction apparatus configured to predict a future communication speed between a first communication apparatus and a second communication apparatus that is capable of relatively move to the first communication apparatus, the communication speed prediction apparatus includes: a position prediction unit configured to predict a future relative positional relationship between the first and second communication apparatuses; a speed prediction unit configured to predict the future communication speed between the first and second communication apparatuses by using a predicted result by the position prediction unit and a prediction model that is for predicting the future communication speed between the first and second communication apparatuses based on the relative positional relationship between the first and second communication apparatuses; an extraction unit configured to extract, from an information source that includes a plurality of sample information in each of which a past position information relating to a past relative positional relationship between the first and second communication apparatuses is associated with a past speed information relating to a past communication speed between the first and second communication apparatuses, at least one sample information as a training information for training the prediction model; a training unit configured to train a parameter of the prediction model by using the training information; and a model update unit configured to update, by using the parameter trained by the training unit, the prediction model used by the speed prediction unit, in a first period, the training unit trains the parameter and the speed prediction unit does not predict the future communication speed between the first and the second communication apparatuses, in a second period that is different from the first period, the training unit trains the parameter and the speed prediction unit predicts the future communication speed between the first and the second communication apparatuses, a method of extracting the training information by the extraction unit in the first period is different from a method of extracting the training information by the extraction unit in the second period.

A first example aspect of a communication speed prediction method is a communication speed prediction method of predicting a future communication speed between a first communication apparatus and a second communication apparatus that is capable of relatively move to the first communication apparatus, the communication speed prediction method includes: predicting a future relative positional relationship between the first and second communication apparatuses; predicting the future communication speed between the first and second communication apparatuses by using a predicted result by the position prediction unit and a prediction model that is for predicting the future communication speed between the first and second communication apparatuses based on the relative positional relationship between the first and second communication apparatuses; extracting, from an information source that includes a plurality of sample information in each of which a past position information relating to a past relative positional relationship between the first and second communication apparatuses is associated with a past speed information relating to a past communication speed between the first and second communication apparatuses, at least one sample information as a training information for training the prediction model; training a parameter of the prediction model by using the training information; updating, by using the trained parameter, the prediction model that is used to predict the future communication speed between the first and second communication apparatuses; and changing, based on at least one of a state of the communication speed prediction apparatus and a state of the first and second communication apparatuses, an update frequency by which the prediction model is updated.

A second example aspect of a communication speed prediction method is a communication speed prediction method of predicting a future communication speed between a first communication apparatus and a second communication apparatus that is capable of relatively move to the first communication apparatus, the communication speed prediction method includes: predicting a future relative positional relationship between the first and second communication apparatuses; predicting the future communication speed between the first and second communication apparatuses by using a predicted result by the position prediction unit and a prediction model that is for predicting the future communication speed between the first and second communication apparatuses based on the relative positional relationship between the first and second communication apparatuses; extracting, from an information source that includes a plurality of sample information in each of which a past position information relating to a past relative positional relationship between the first and second communication apparatuses is associated with a past speed information relating to a past communication speed between the first and second communication apparatuses, at least one sample information as a training information for training the prediction model; training a parameter of the prediction model by using the training information; and updating, by using the trained parameter, the prediction model that is used to predict the future communication speed between the first and second communication apparatuses, in a first period, the parameter is trained and the future communication speed between the first and the second communication apparatuses is not predicted, in a second period that is different from the first period, the parameter is trained and the future communication speed between the first and the second communication apparatuses is trained, a method of extracting the training information in the first period is different from a method of extracting the training information in the second period.

A first example aspect of a recording medium is a recording medium on which a computer program allowing a computer to execute a communication speed prediction method of predicting a future communication speed between a first communication apparatus and a second communication apparatus that is capable of relatively move to the first communication apparatus, the communication speed prediction method includes: predicting a future relative positional relationship between the first and second communication apparatuses; predicting the future communication speed between the first and second communication apparatuses by using a predicted result by the position prediction unit and a prediction model that is for predicting the future communication speed between the first and second communication apparatuses based on the relative positional relationship between the first and second communication apparatuses; extracting, from an information source that includes a plurality of sample information in each of which a past position information relating to a past relative positional relationship between the first and second communication apparatuses is associated with a past speed information relating to a past communication speed between the first and second communication apparatuses, at least one sample information as a training information for training the prediction model; training a parameter of the prediction model by using the training information; updating, by using the trained parameter, the prediction model that is used to predict the future communication speed between the first and second communication apparatuses; and changing, based on at least one of a state of the communication speed prediction apparatus and a state of the first and second communication apparatuses, an update frequency by which the prediction model is updated.

A second example aspect of a recording medium is a recording medium on which a computer program allowing a computer to execute a communication speed prediction method of predicting a future communication speed between a first communication apparatus and a second communication apparatus that is capable of relatively move to the first communication apparatus, the communication speed prediction method includes: predicting a future relative positional relationship between the first and second communication apparatuses; predicting the future communication speed between the first and second communication apparatuses by using a predicted result by the position prediction unit and a prediction model that is for predicting the future communication apparatuses, at least one sample information as a training information for training the prediction model; training a parameter of the prediction model by using the training information; and updating, by using the trained parameter, the prediction model that is used to predict the future communication speed between the first and second communication apparatuses, in a first period, the parameter is trained and the future communication speed between the first and the second communication apparatuses is not predicted, in a second period that is different from the first period, the parameter is trained and the future communication speed between the first and the second communication apparatuses is trained, a method of extracting the training information in the first period is different from a method of extracting the training information in the second period.

Advantageous Effects of Invention

According to the communication speed prediction apparatus, the communication speed prediction method and the recording medium described above, it is possible to properly update the prediction model that is used to predict the communication speed.

Figure 9A:
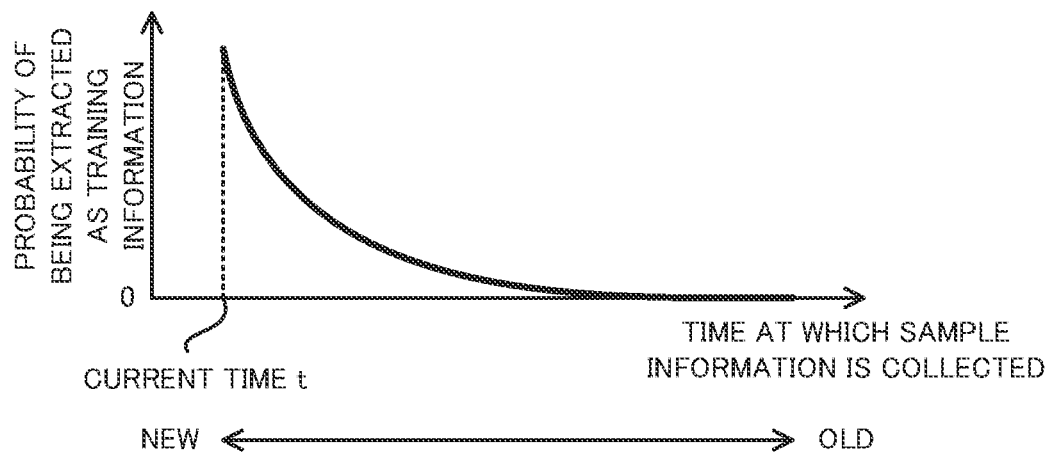
Figure 9B:
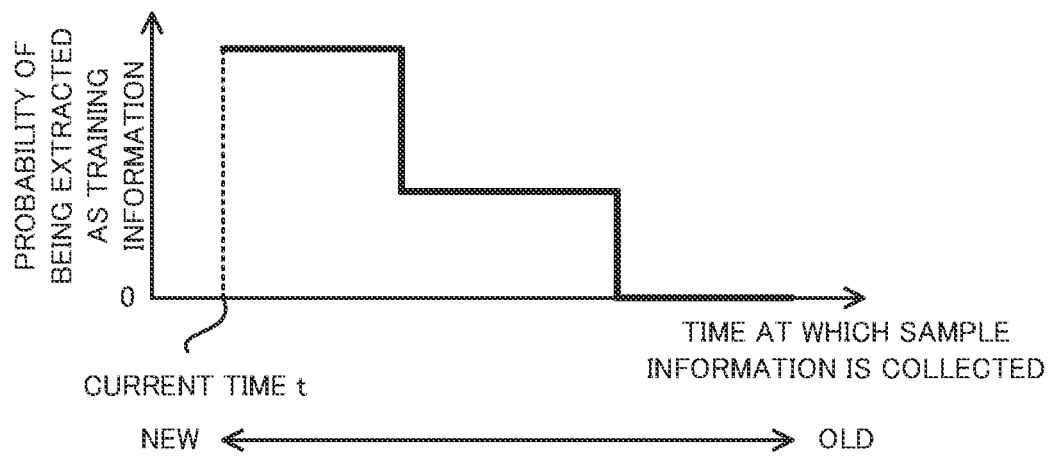

Each of FIG. 9A to FIG. 9B is a graph that illustrates a probability that each sample information included in the past information is extracted as a training information in the continuous training operation.

Each of FIG. 10A to FIG. 10B is a graph that illustrates an update frequency of the prediction model that is designated by an update frequency information.

Each of FIG. 11A to FIG. 11D is a graph that illustrates the update frequency of the prediction model that is designated by the update frequency information.

Each of FIG. 12A to FIG. 12D is a graph that illustrates the update frequency of the prediction model that is designated by the update frequency information.

Figure 13:
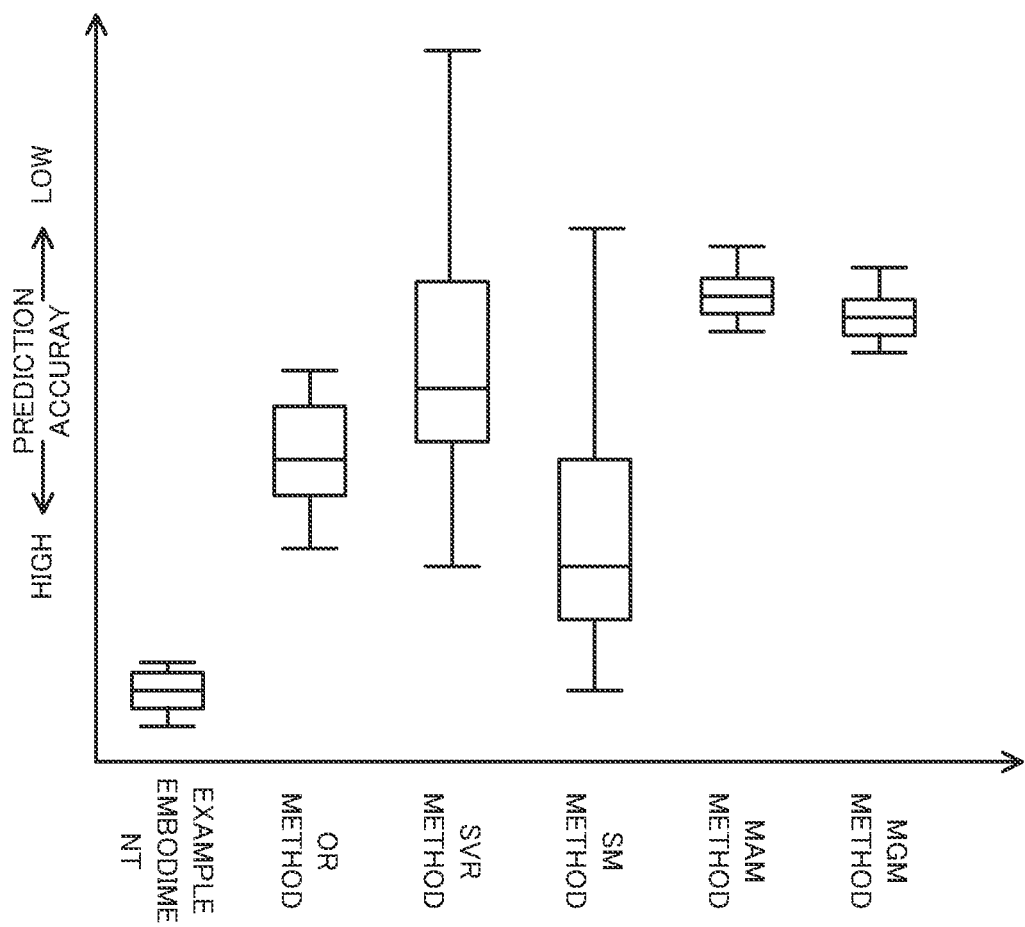

FIG. 13 is a box plot that illustrates a prediction accuracy of the prediction model that is updated by using a training result using the sample information collected at a relatively latest time, together with a prediction accuracy in an existing method of predicting the communication speed.

Figure 14:
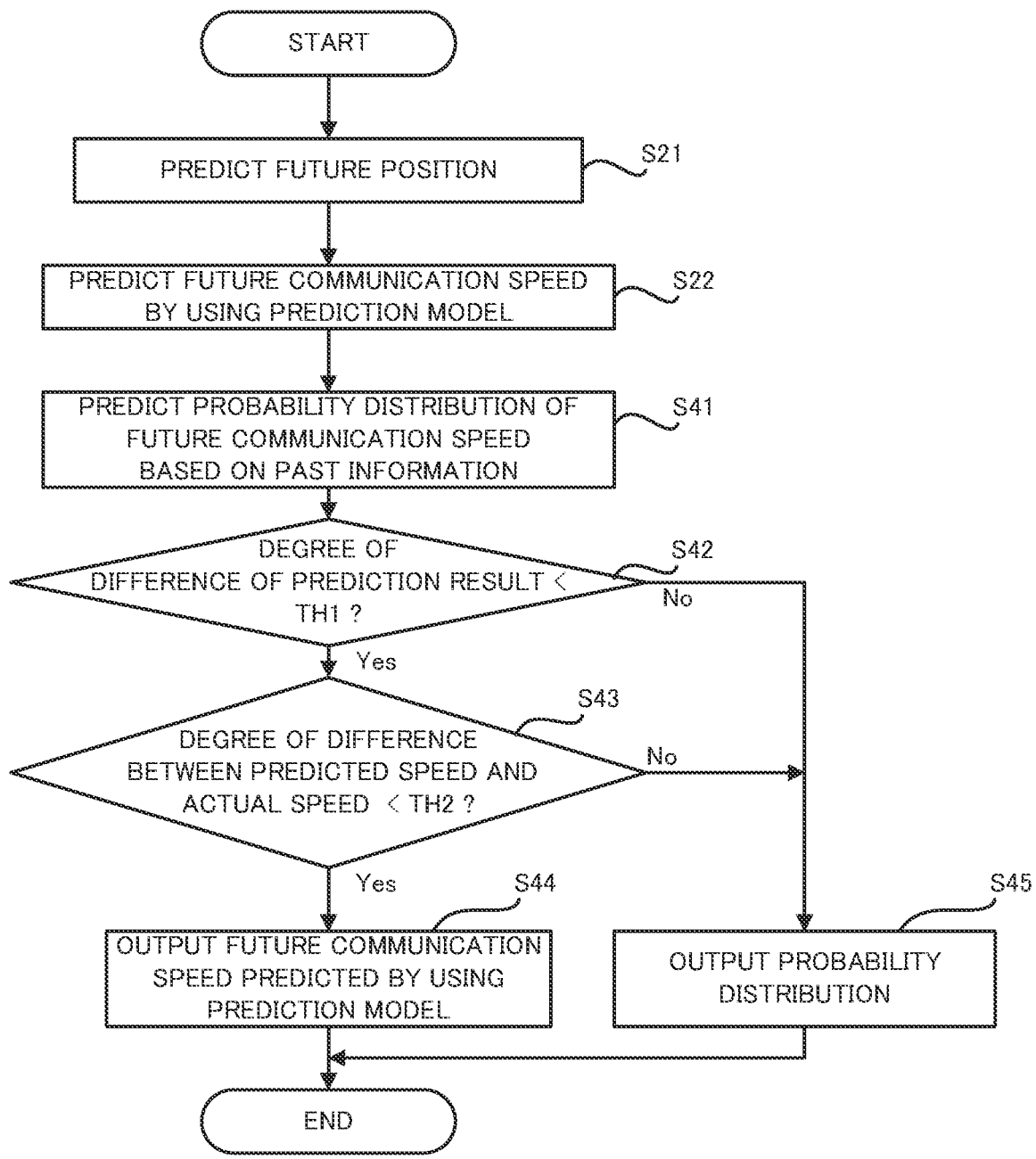

FIG. 14 is a flowchart that illustrates a flow of the prediction operation in a modified example.

DESCRIPTION OF EXAMPLE EMBODIMENTS

Next, with reference to the drawings, an example embodiment of a communication speed prediction apparatus, a communication speed prediction method and a recording medium will be described. Note that an expression "X and/or Y" is an expression that means both of "X and Y" and "X or Y" in the below described description.

<1> Configuration of Communication Speed Prediction Apparatus 1

Figure 1:
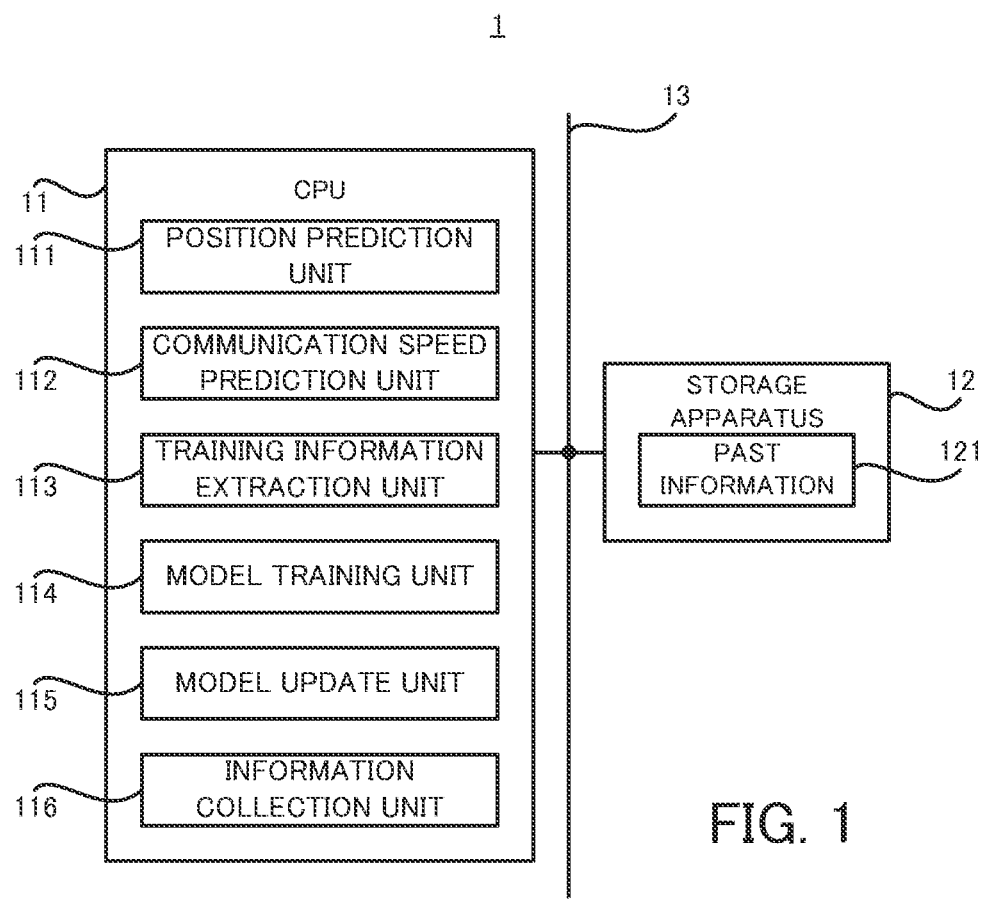
FIG. 1 is a block diagram that illustrates a configuration of a communication speed prediction apparatus in a present example embodiment.

Firstly, with reference to FIG. 1, a communication speed prediction apparat 1 in the present example embodiment will be described. FIG. 1 is a block diagram that illustrates a configuration of the communication speed prediction apparat 1 in the present example embodiment.

As illustrated in FIG. 1, the communication speed prediction apparatus 12 includes a CPU (Central Processing Unit) 11 and a storage apparatus 12. The CPU 11 and the storage apparatus 12 are connected through a data bus 13.

The CPU 11 reads a computer program. For example, the CPU 11 may read a computer program stored in the storage apparatus 12. For example, the CPU 11 may read a computer program stored in a computer-readable recording medium, by using a not-illustrated recording medium reading apparatus. The CPU 11 may obtain (namely, read) a computer program from a not-illustrated apparatus disposed outside the communication speed prediction apparatus 1, through a network interface. In the present example embodiment, when the CPU 11 executes the read computer program, a logical functional block for performing a communication speed prediction operation is implemented in the CPU 11. Namely, the CPU 11 is configured to function as a controller for implementing the logical block for performing the communication speed prediction operation.

The communication speed prediction operation is an operation for predicting a future communication speed (namely, a communication speed at a time that is after a current time) between two communication apparatuses that are configured to communicate with each other. The communication speed here may be a communication speed (in other words, a communication throughput) at at least one of seven layers in an OSI (Open System Interconnection) reference model. For example, the communication speed prediction operation may be an operation for predicting the future communication speed at an application layer.

Figure 2:
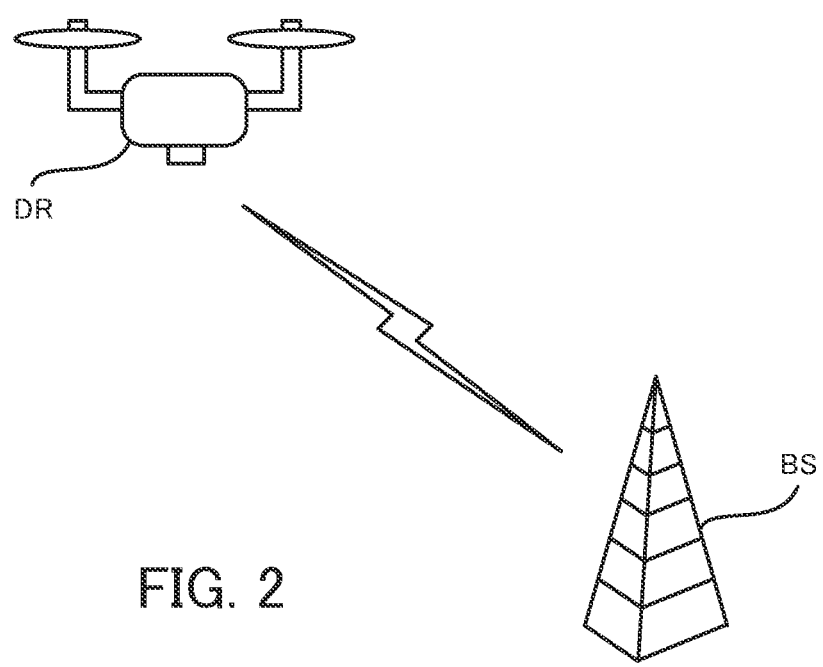
FIG. 2 is a conceptional view that conceptionally illustrates a drone and a ground base station that are configured to communicate with each other.

Especially, the communication speed prediction operation is an operation for predicting the future communication speed between two communication apparatuses either one of which is movable relative to the other one. FIG. 2 illustrates one example of the two communication apparatuses either one of which is movable relative to the other one. As illustrated in FIG. 2, the two communication apparatuses may include a drone DR that is a flying object configured to fly in the air (namely, configured to move in the air) and a ground base station BS (in other words, an access point) that is configured to communicate with the drone DR and that is located on the ground. In this case, the communication speed prediction operation is an operation for predicting the future communication speed between the ground base station BS and the drone DR that is movable relative to the ground base station BS. Especially, the communication speed prediction operation is an operation for predicting the future communication speed between the ground base station BS and the drone DR, which is likely to vary from moment to moment depending on the movement of the drone DR. In the below described description, the communication speed prediction operation predicting the future communication speed between the ground base station BS and the drone DR will be described for convenience of description.

However, the communication speed prediction operation may be an operation for predicting the future communication speed between any two communication apparatuses either one of which is movable relative to the other one. For example, the communication speed prediction operation may be an operation for predicting the future communication speed between a flying object that is configured to fly in the air or to hover in the air and a mobile base station that is configured to communicate with the flying object and that is movable on the ground or in the air. For example, the communication speed prediction operation may be an operation for predicting the future communication speed between a mobile object that is movable on the ground and a ground base station that is configured to communicate with the mobile object and that is located on the ground. For example, the communication speed prediction operation may be an operation for predicting the future communication speed between a mobile object that is movable on the ground and a mobile base station that is configured to communicate with the mobile object and that is movable on the ground or in the air.

The communication speed prediction apparatus 1 may be built into at least one of the two communication apparatuses that are targets for the communication speed prediction operation. Namely, the communication speed prediction apparatus 1 may be built into at least one of the drone DR and the ground base station BS. At least one of the drone DR and the ground base station BS may include the communication speed prediction apparatus 1. In this case, the CPU 11 and the storage apparatus 12 may be a CPU and a storage apparatus of at least one of the two communication apparatuses, respectively. Namely, the CPU 11 and the storage apparatus 12 may be a CPU and a storage apparatus of at least one of the drone DR and the ground base station BS, respectively. At least one of the drone DR and the ground base station BS may include the CPU 11 and the storage apparatus 12. Alternatively, the communication speed prediction apparatus 1 may be an apparatus that is different from at least one of the two communication apparatuses that are targets for the communication speed prediction operation. Namely, the communication speed prediction apparatus 1 may be an apparatus that is different from the drone DR and the ground base station BS.

Again in FIG. 1, the CPU 61 includes a position prediction unit 111, a speed prediction unit 112, a training information extraction unit 113, a model training unit 114, a model update unit 115 and an information collection unit 116 as the logical functional blocks for realizing the communication speed prediction operation. A part of these functional blocks may be realized in a GPU (Graphics Processing Unit) that is built into the CPU 11 or that is connected to the communication speed prediction apparatus 1.

The position prediction unit 111 predicts a future position of the drone DR. Note that the drone DR moves relative to the ground base station BS. Thus, when the drone DR moves, a relative positional relationship between the drone DR and the ground base station BS changes. In this case, an operation for predicting the future position of the drone DR is substantially equivalent to an operation for predicting a future relative positional relationship between the drone DR and the ground base station BS.

The communication speed prediction unit 112 predicts the future communication speed between the drone DR and the ground base station BS by using a prediction model PD and the future position of the drone DR predicted by the position prediction unit 111. The prediction model PD is an arithmetic model that outputs a communication speed between the drone DR and the ground base station BS at a certain time when a position of the drone DR at this certain time is inputted thereto. Namely, the prediction model PD is an arithmetic model that predicts the communication speed between the drone DR and the ground base station BS at a certain time based on the position of the drone DR at this certain time. The prediction model PD may be any prediction model as long as it is capable of predicting the communication speed between the drone DR and the ground base station BS based on the position of the drone DR.

In the present example embodiment, the prediction model PD is a prediction model using a RNN (Recurrent Neural Network). In this case, the communication speed prediction unit 112 inputs, to the prediction model PD, time-series data of the position of the drone DR including the future position of the drone DR. As a result, the prediction model PD outputs time-series data of the communication speed between the drone DR and the ground base station BS including the future communication speed between the drone DR and the ground base station BS.

Figures 3, 4:
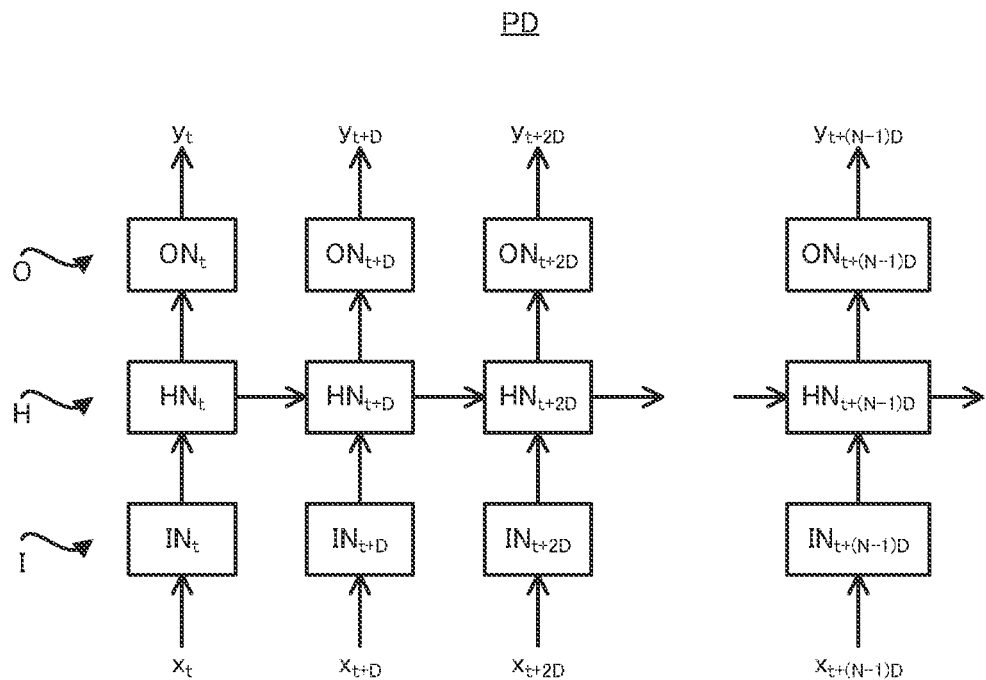
FIG. 3 a block diagram that illustrates one example of a configuration of a prediction model using a RNN (Recurrent Neural Network).
FIG. 4 is a table that illustrates a data structure of a past information.

FIG. 3 illustrates one example of the prediction model PD using the RNN. As illustrated in FIG. 3, the prediction model PD may include an input layer I, a hidden layer H and an output layer O. The input layer I may include N (note that N is an integer that is equal to or larger than 2) input nodes IN. The hidden layer H may include N hidden nodes HN. The output layer O may include N output nodes ON. To the N input nodes IN, N position data x that is a temporal sequence included in the time series data of the position of the drone DR are inputted, respectively.

The prediction model PD includes the N input nodes IN described below in order to allow the N position data x to be inputted. Namely, the prediction model PD includes (1) the input node $IN_t$ to which the position data $x_t$ that indicates the position of the drone DR at a time t is inputted, (2) the input node $IN_{t+D}$ to which the position data $x_{t+D}$ that indicates the position of the drone DR at a time t+D is inputted, (3) the input node $IN_{t+2D}$ to which the position data $x_{t+2D}$ that indicates the position of the drone DR at a time t+2D is inputted, . . . , (snip), . . . , and (N) the input node $IN_{t+(N-1)D}$ to which the position data $x_{t+(N-1)D}$ that indicates the position of the drone DR at a time t+(N−1)D is inputted, as illustrated in FIG. 3 as one example. Note that D is a variable number that indicates a reference cycle. The variable number D may be a value between several dozens of milli-seconds to several hundreds of milli-seconds and may be set based on a temporal resolution of a predicted value that is necessary for an application.

Next, the N position data x inputted to the N input nodes IN are inputted to the N hidden nodes HN, respectively. Specifically, the prediction model PD includes the N hidden nodes HN described below Namely, the prediction model PD includes (1) the hidden node $HN_t$ to which the position data $x_t$ inputted to the input node $IN_t$ is inputted, (2) the hidden node $HN_{t+D}$ to which the position data $x_{t+D}$ inputted to the input node $IN_{t+D}$ is inputted, (3) the hidden node $HN_{t+2D}$ to which the position data $x_{t+2D}$ inputted to the input node $IN_{t+2D}$ is inputted, . . . , (snip), . . . , and (N) the hidden node $HN_{t+(N-1)D}$ to which the position data $x_{t+(N-1)D}$ inputted to the input node $IN_{t+(N-1)D}$ is inputted, as illustrated in FIG. 3 as one example. Note that each hidden node HN may be a node that is compliant to a LSTM (Long Short Term Memory), or may be a node that is compliant to another network structure.

Next, outputs of the N hidden nodes HN are inputted to the N output nodes ON, respectively. Specifically, the prediction model PD includes the N output nodes ON described below Namely, the prediction model PD includes (1) the output node $ON_t$ to which the output of the hidden node $HN_t$ is inputted, (2) the output node $ON_{t+D}$ to which the output of the hidden node $HN_{t+D}$ is inputted, (3) the output node $ON_{t+2D}$ to which the output of the hidden node $HN_{t+3D}$ is inputted, . . . , (snip), . . . , and (N) the output node $ON_{t+(N-1)D}$ to which the output of the hidden node $HN_{t+(N-1)D}$ is inputted, as illustrated in FIG. 3 as one example.

Furthermore, the output of each of the N hidden nodes HN is inputted to next hidden node NN as illustrated by a horizontal arrow in FIG. 3. Namely, the output of the hidden node $HN_t$ is inputted to the hidden node $HN_{t+D}$, the output of the hidden node $HN_{t+D}$ is inputted to the hidden node $HN_{t+2D}$, . . . , (snip), . . . , and the output of the hidden node $HN_{t+(N-2)D}$ is inputted to the hidden node $HN_{t+(N-1)D}$.

Then, the N output nodes ON output time series data of the communication speed between the drone DR and the base station BS including the future communication speed between the drone DR and the base station BS. Specifically, the prediction model PD includes the N output nodes ON. Namely, the prediction model PD includes (1) the output node $ON_t$ that outputs speed data $y_t$ that indicates a communication speed between the drone DR and the ground base station BS at the time t, (2) the output node $ON_{t+D}$ that outputs speed data $y_{t+D}$ that indicates a communication speed between the drone DR and the ground base station BS at the time t+D, (3) the output node $ON_{t+2D}$ that outputs speed data $y_{t+2D}$ that indicates a communication speed between the drone DR and the ground base station BS at the time t+2D, . . . , (snip), . . . , and (N) (2) the output node $ON_{t+(N-1)D}$ that outputs speed data $y_{t+(N-1)D}$ that indicates a communication speed between the drone DR and the ground base station BS at the time t+(N−1)D, as illustrated in FIG. 3 as one example.

Note that at least one of the time t to time t+(N−1)D is a future time. In the present example embodiment, it is assumed that the time t is the current time for convenience of description. In this case, the time t+D to the time t+(N−1)D correspond to the future time. Therefore, the above described position prediction unit 111 predicts the position of the drone DR at the time t+D, the position of the drone DR at the time t+2D, . . . , and the position of the drone DR at the time t+(N−1)D. The communication speed prediction unit 112 predicts the communication speed between the drone DR and the ground base station BS at the time t+D, the communication speed between the drone DR and the ground base station BS at the time t+2D, . . . , and the communication speed between the drone DR and the ground base station BS at the time t+(N−1)D.

When the prediction model PD uses the RNN, a layer upper limit value may be set with respect to the number (namely, the layer number) of the hidden layer H of the prediction model PD. The layer upper limit value is preferably 1, for example, however, may be an integer that is equal to or larger than 2. Moreover, a node upper limit value may be set with respect to the number (namely, the hidden state number) of the hidden node HN included in the hidden layer H, too. The node upper limit value is preferably an integer that is equal to or larger than 10, for example, however, may be an integer that is equal to or larger than 11. Moreover, the prediction model PD may be generated while changing at least one of the number of the hidden layer H and the number of the hidden node HN and at least one of the number of the hidden layer H and the number of the hidden node HN may be determined based on a prediction accuracy of the prediction model PD.

The training information extraction unit 113 generates a training information that is used for a training of the prediction model PD. Specifically, the training information extraction unit 113 extracts, as the training information, a part of a past information 121 that includes a plurality of sample information in each of which a past position information (specifically, the position data x) indicating a past position of the drone DR is associated with a past speed information (specifically, the speed data y) indicating a past communication speed between the drone DR and the ground base station BS. In this case, the communication speed prediction apparatus 1 (especially, the information collection unit 116 described later) may connect the position data x and the speed data y. The past information 121 included the collected position data x and speed data y may be stored in the storage apparatus 12.

FIG. 4 illustrates one example of the past information 121. The past information 121 includes a sample information in which the position data $x_t$ indicating the position of the drone DR at the time t is associated with the speed data $y_t$ indicating the communication speed between the drone DR and the ground base station BS at the time t, a sample information in which position data $x_{t-D}$ indicating the position of the drone DR at a time t−D is associated with speed data $y_{t-D}$ indicating the communication speed between the drone DR and the ground base station BS at the time t−D, . . . , and a sample information in which position data $x_{t-MD}$ indicating the position of the drone DR at a time t−MD (note that M is an integer that is equal to or larger than 1 and that is multiplied by the reference cycle D) is associated with speed data $y_{t-MD}$ indicating the communication speed between the drone DR and the ground base station BS at the time t−MD. Note that the time t indicates the current time in the present example embodiment as described above, however, the time t at which the position data $x_t$ and the speed data $y_t$ are collected is a time that is before the current time in a strict sense. Namely, the time t corresponds to a latest time at which the position data $x_t$ and the speed data $y_t$ are collected. Thus, in the present example embodiment, the current time t means the latest past time t at which the position data $x_t$ and the speed data $y_t$ are collected. Moreover, the speed data $y_t$ may be calculated by a result of an actually performed communication, in addition to a method of calculating it from a modulation method and a code rate. The speed data $y_t$ calculated by the result of the actually performed communication may be a value that is obtained by diving a communication traffic in a period from the time t−D to time t by D (=t−(t−D)), or may be a value that is obtained by diving a size of the communicated data by a time required for the communication.

The model training unit 114 trains the prediction model PD based on the training information extracted by the training information extraction unit 113. Specifically, the model training unit 114 trains a parameter of the prediction model PD so that a difference between the speed data y included in the training information and an output of the prediction model PD when the position data x included in the training information is inputted to the prediction model PD is minimum.

The model update unit 115 updates the prediction model PD that is actually used by the communication speed prediction unit 112 to predict the future communication speed. Specifically, the model update unit 115 updates the prediction model PD by applying a trained result of the training unit 114 to the prediction model PD that is actually used by the communication speed prediction unit 112 to predict the future communication speed. After the prediction model PD is updated, the communication speed prediction unit 112 predicts the future communication speed by using the updated prediction model PD (namely, the prediction model PD to which the training result of the training unit 114 is applied). Namely, even when the model training unit 114 trains the prediction model PD, the communication speed prediction unit 112 predicts the future communication speed by using the non-updated prediction model PD to which the training result of the training unit 114 is not applied unless the model update unit 115 updates the prediction model PD.

Thus, in the present example embodiment, the communication speed prediction apparatus 1 substantially includes a first prediction model PD that is actually used by the communication speed prediction unit 112 to predict the future communication speed and a second prediction model PD that is trained by the training unit 114. In this case, the model update unit 115 updates the first prediction model PD by applying the parameter of the second prediction model PD trained by the model training unit 114 to the first prediction model PD used by the communication speed prediction unit 112. In the below described description, the prediction model PD that is actually used by the communication speed prediction unit 112 to predict the future communication speed is referred to as a "prediction model PD1" and the prediction model PD that is trained by the training unit 114 is referred to as a "prediction model PD2" to distinguish both. The prediction model PD1 and the prediction model PD2 are models having same network structure (for example, models having same input layer I, same hidden layer H and same output layer O).

The information collection unit 116 collects (namely, acquire) a desired information. Especially in the present example embodiment, the information collection unit 116 collects an information that is necessary for performing the communication speed prediction operation. For example, the information collection unit 116 may collect the information from at least one of the drone DR and the ground base station BS. When the information collection unit 116 is the apparatus that is different from the drone DR and the ground base station BS, the information collection unit 116 may collect the information by communicating with at least one of the drone DR and the ground base station BS. When the information collection unit 116 is built into at least one of the drone DR and the ground base station BS, the information collection unit 116 may collect the information from each apparatus or each processing unit of at least one of the drone DR and the ground base station BS.

The information collection unit 116 may collect the position data x indicating the position of the drone DR, for example. For example, the drone DR includes a position measurement apparatus such as a GPS (Global Positioning System), the information collection unit 116 may collect the position data x indicating the position of the drone DR that is actually measured by the position measurement apparatus. Note that the position data x is equivalent to an information indicating the relative positional relationship between the drone DR and the ground base station BS, because the relative positional relationship between the drone DR and the ground base station BS change when the drone DR moves, as described above.

The information collection unit 116 may collect the speed data y indicating the communication speed between the drone DR and the ground base station BS, for example. For example, when one of the drone DR and the ground base station BS transmits data for measuring the communication speed at a predetermined transmission rate to the other one of the drone DR and the ground base station BS and the other one of the drone DR and the ground base station BS measures a time that is required to receive the data, the communication speed between the drone DR and the ground base station BS can be actually measured. In this case, the information collection unit 116 may collect the speed data y indicating the communication speed between the drone DR and the ground base station BS that is actually measured by one of the drone DR and the ground base station BS.

The position data x and the speed data y collected by the information collection unit 116 are stored as the past information 121 in the storage apparatus 12 with them being associated for each time. Note that the speed data y included in the past information 121 is not data indicating the communication speed predicted by the communication speed prediction unit 112 (namely, the speed data y outputted from the prediction model PD1) but data indicating the actually measured communication speed (namely, the speed data y collected from one of the drone DR and the ground base station BS by the information collection unit 116), as can be seen from the above described description.

The storage apparatus 12 is an apparatus that is configured to store a desired data. Especially in the present example embodiment, the storage apparatus 12 stores an information that is necessary for performing the communication speed prediction operation. For example, the storage apparatus 12 stores the past information 121 described above. The storage apparatus 12 may include at least one of a ROM (Read Only Memory), a RAM (Random Access Memory), a hard disk apparatus, a magneto-optical disc, a SSD (Solid State Drive) and a disk array apparatus.

An information relating to the future communication speed predicted by the communication speed prediction operation may be outputted to at least one of the drone DR and the ground base station BS. For example, when the information collection unit 116 is the apparatus that is different from the drone DR and the ground base station BS, the communication speed prediction apparatus 1 may include a communication apparatus that outputs (transmits) the information relating to the future communication speed to at least one of the drone DR and the ground base station BS by communicating with at least one of the drone DR and the ground base station BS. When the information collection unit 116 is built into at least one of the drone DR and the ground base station BS, the information relating to the future communication speed may be inputted from the communication speed prediction unit 112 to each apparatus or each processing unit of at least one of the drone DR and the ground base station BS.

The information relating to the future communication speed may be used to control a transmission rate of an information that is transmitted form the drone DR to the ground base station BS. The information relating to the future communication speed may be used to control a transmission rate of an information that is transmitted form the ground base station BS to the drone DR. As a result, one of the drone DR and the ground base station BS is capable of properly transmitting the information to the other one of the drone DR and the ground base station BS. For example, when the drone DR transmits a video (namely, moving image) data to the ground base station BS, the drone DR may control, based on the information relating to the future communication speed, a bit rate of the vide data transmitted from the drone DR. As a result, the drone DR is capable of transmitting the vide data having a proper bit rate to the ground base station BS.

<2> Communication Speed Prediction Operation Performed by Communication Speed Prediction Apparatus 1

Next, the communication speed prediction operation performed by the communication speed prediction apparatus 1 will be described. In the present example embodiment, the communication speed prediction apparatus 1 starts the communication speed prediction operation when the drone DR starts to fly. Thus, the communication speed prediction apparatus 1 performs the communication speed prediction operation in at least a part of a period in which the drone DR flies. Moreover, the relative positional relationship between the drone DR and the ground base station BS changes during the period in which the drone DR flies. Thus, it can be said that the communication speed prediction apparatus 1 performs the communication speed prediction operation in at least a part of a period in which the relative positional relationship between the drone DR and the ground base station BS changes. Moreover, there is a possibility that the communication speed between the drone DR and the ground base station BS changes during the period in which the relative positional relationship between the drone DR and the ground base station BS changes. Thus, it can be said that the communication speed prediction apparatus 1 performs the communication speed prediction operation in at least a part of a period in which there is a possibility that the communication speed between the drone DR and the ground base station BS changes.

The communication speed prediction apparatus 1 performs an initial training operation for training the prediction model PD2 without predicting the future communication speed between the drone DR and the ground base station BS before a predetermined time elapses from a time at which the communication speed prediction operation is started. For example, the communication speed prediction apparatus 1 performs the initial training operation without predicting the future communication speed between the drone DR and the ground base station BS before a time corresponding to a (1÷K) times of a flying scheduled time of the drone DR elapses from the time at which the communication speed prediction operation is started. Note that K is a real number that is equal to or larger than 1, and may be 6, for example. Alternatively, a prediction value may be calculated when a value of K is changed relative to data collected in advance, and the value of K may be determined by using each prediction accuracy. On the other hand, the communication speed prediction apparatus 1 performs a prediction operation for predicting the future communication speed between the drone DR and the ground base station BS by using the prediction model PD1 to which the parameter of the prediction model PD2 trained by the initial training operation is applied after the predetermined time elapses from the time at which the communication speed prediction operation is started. Namely, the communication speed prediction apparatus 1 starts the prediction operation by using the prediction model PD1 to which the parameter of the prediction model PD2 trained by the initial training operation is applied after the predetermined time elapses from a time at which the training of the prediction model PD2 is started by the initial training operation. Furthermore, the communication speed prediction apparatus 1 performs a continuous training operation for training the prediction model PD2 in parallel with the prediction operation. Namely, the communication speed prediction apparatus 1 predicts the future communication speed between the drone DR and the ground base station BS by using the prediction model PD1 and performs an online-training of the prediction model PD2. Thus, in the below described description, the initial training operation, the prediction operation and the continuous training operation will be described in order.

<2-1> Initial Training Operation

Firstly, a flow of the initial training operation will be described. As described above, the initial training operation is started after the drone DR starts to fly.

After the drone DR starts to fly, the information collection unit 116 of the communication speed prediction apparatus 1 continuously collects the position data x indicating the position of the drone DR and the speed data y indicating the communication speed between the drone DR and the ground base station BS. Thus, for example, the drone DR may transmit (output) the position data x indicating the position of the drone DR that is actually measured by the drone DR to the information collection unit 116 periodically (for example, every time the reference cycle elapses). For example, at least one of the drone DR and the ground base station BS may transmit (output) the speed data y indicating the communication speed between the drone DR and the ground base station BS that is actually measured by at least one of the drone DR and the ground base station BS to the information collection unit 116 periodically (for example, every time the reference cycle elapses).

The communication speed prediction apparatus 1 starts the initial training operation on the condition that the position data x and the speed data y (namely, the past information 121) an amount of which is enough for performing the initial training operation are collected. This is because the initial training operation is performed based on the training information extracted from the past information 121, and thus, the training information (namely, the past information 121) an amount of which is equal to or larger than a predetermined amount is necessary for performing the initial training operation.

Figure 5:
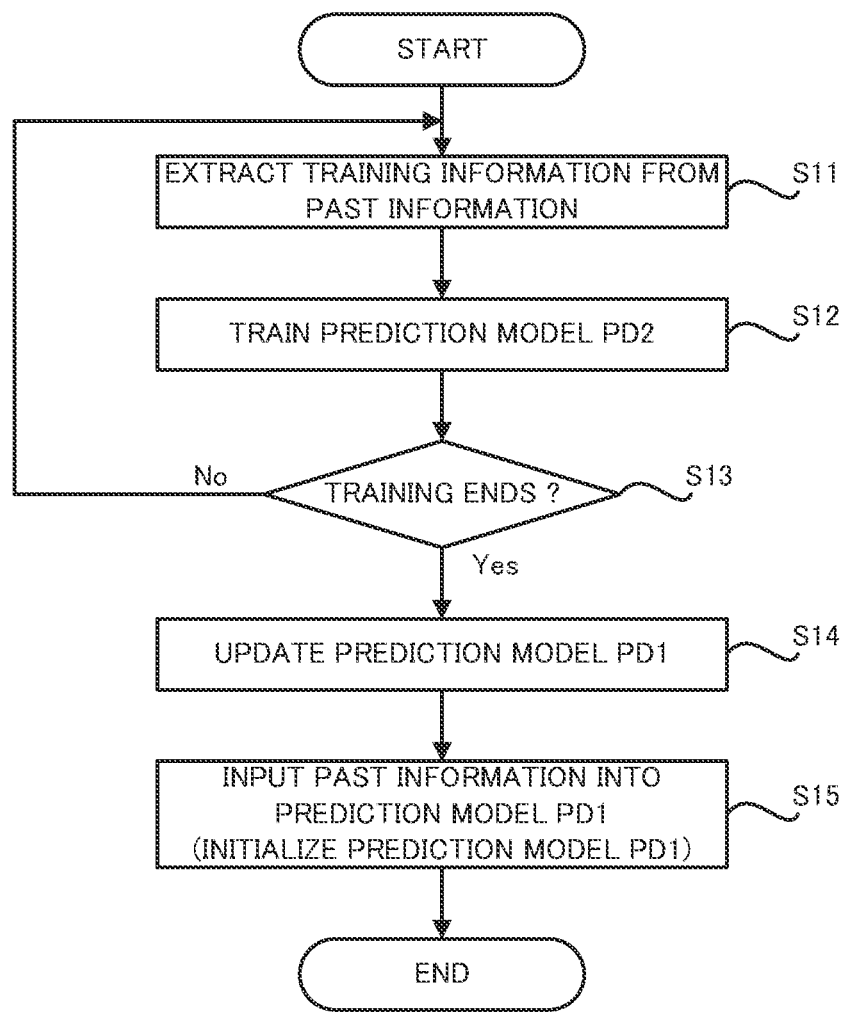
FIG. 5 is a flow chart that illustrates a flow of an initial training operation that is a part of a communication speed prediction operation.

Next, with reference to FIG. 5, the flow of the initial training operation will be described. FIG. 5 is a flowchart that illustrates the flow of the initial training operation that is a part of the communication speed prediction operation.

Firstly, the training information extraction unit 113 extracts the training information from the past information 121 stored in the storage apparatus 12 (a step S11). Specifically, the training information extraction unit 113 extracts, as the training information, S sample information (namely, S positional data x and S speed data y that are associated with the S position data x) that correspond to sequential S times from the past information 121 stored in the storage apparatus 12. Note that S is an integer that is equal to or larger than 2, and may be 50. Alternatively, a prediction value may be calculated when a value of S is changed relative to data collected in advance, and the value of S may be determined by using each prediction accuracy. In this case, the training information extraction unit 113 randomly extracts the S sample information from the past information 121. Specifically, the training information extraction unit 113 randomly extracts the S sample information based on a condition that a probability that each sample information included in the past information 121 is extracted as the training data is constant (alternatively, a random) regardless of a time corresponding to the sample information. For example, the training information extraction unit 113 may randomly select a time t_start and extract S sample information corresponding to the selected time t_start to a time t_start+ (S−1)D, respectively t, as the training information.

Then, the model training unit 114 trains the prediction model PD2 based on the training information extracted at the step S11 (a step S12). Specifically, the model training unit 114 inputs the S position data x included in the training information into the input layer I of the prediction model PD2 in sequence. Then, the model training unit 114 trains the parameter of the prediction model PD2 so that an error function that is determined based on a difference between the output of the prediction model PD2 and the S speed data y included in the training information is minimum. The parameter of the prediction model PD2 may include at least one of a weight and a bias, for example.

Then, the model training unit 114 determines whether or not the training of the prediction model PD2 is ended (a step S13). For example, the model training unit 114 may determine that the training of the prediction model PD2 is not ended (namely, is continued) when a certain time does not elapse from the time at which the communication speed prediction operation is started (namely, the initial training operation is started). For example, the model training unit 114 may determine that the training of the prediction model PD2 is ended when a certain time already elapses from the time at which the communication speed prediction operation is started (namely, the initial training operation is started).

As a result of the determination at the step S13, when it is determined that the training of the prediction model PD2 is not ended (the step S13: No), the model training unit 114 performs the operations at the steps S11 and S12 again. Namely, the training information extraction unit 113 newly extracts S sample information from the past information 121 as the training information, and trains the prediction model PD2 based on the newly extracted training information.

On the other hand, as a result of the determination at the step S13, when it is determined that the training of the prediction model PD2 is ended (the step S13: Yes), the model update unit 115 updates the prediction model PD1 by using the trained result by the model training unit 114 at the step S12 (namely, the trained parameter) (a step S13). Namely, the model update unit 115 applies the trained result by the model training unit 114 at the step S12 (namely, the trained parameter) to the prediction model PD1 that is actually used by the communication speed prediction unit 112 to predict the future communication speed. For example, when the prediction model PD1 is logically built in the communication speed prediction unit 112, the model update unit 115 updates (namely, rewrite or replace) the parameter of the prediction model PD1 that is logically built in the communication speed prediction unit 112 by the parameter of the PD2 trained at the step S12. Alternatively, for example, when the prediction model PD1 is stored in the storage apparatus 12 and the communication speed prediction unit 112 uses the prediction model PD1 stored in the storage apparatus 12, the model update unit 115 updates the parameter of the prediction model PD1 stored in the storage apparatus 12 by the parameter of the PD2 trained at the step S12. As a result, the prediction model PD1 that is actually used by the communication speed prediction unit 112 to predict the future communication speed is actually updated.

However, when the prediction model PD uses the RNN, the output of the prediction model PD corresponding to the communication speed at one time depends on the position data x (especially, the time-series data of the position data x) at another time that is before one time. Namely, the output of the prediction model PD corresponding to the communication speed at one time depends on the output of the hidden node HN corresponding to another time that is before one time. However, when the time-series data of the position data x is not inputted to the input layer I of the prediction model PD although the prediction model PD is updated, the output of the hidden node HN is not an output in which the time-series data of the position data x is not reflected. Therefore, there is a possibility that the prediction accuracy of the future communication speed by the prediction model PD is low. Thus, when the prediction model PD1 is updated at the step S14, the model update unit 115 initializes the prediction model PD1 updated at the step S14 (a step S15). Specifically, in order to initialize the prediction model PD1, the model update unit 115 inputs the time-series data of the position data x included in the past information 121 into the updated prediction model PD1 (the step S15). For example, the model update unit 115 inputs A position data x corresponding to the time t to time t−(A−1)D, respectively, based on the position data x corresponding to the time t into the prediction model PD1 in sequence. Note that A is an integer that is equal to or larger than 2, and may be a integer between several dozen to several hundred. Alternatively, a prediction value may be calculated when a value of A is changed relative to data collected in advance, and the value of A may be determined by using each prediction accuracy. As a result, the output of the hidden node HN turns into the output in which the time-series data of the position data x is reflected. Namely, a state of the hidden node HN is set to be a state adjusted for predicting the future communication speed.

<2-2> Prediction Operation

Figure 6:
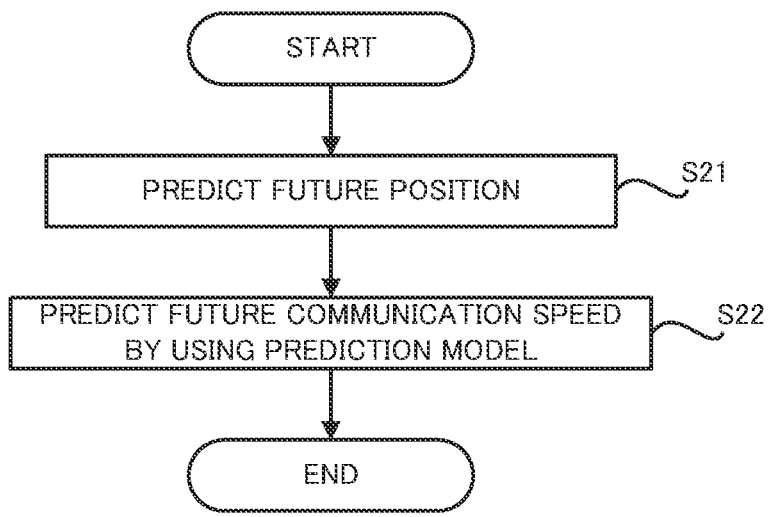
FIG. 6 is a flow chart that illustrates a flow of a prediction operation that is a part of the communication speed prediction operation.

Next, with reference to FIG. 6, the flow of the prediction operation will be described. FIG. 6 is a flowchart that illustrates the flow of the prediction operation that is a part of the communication speed prediction operation.

As illustrated in FIG. 6, the position prediction unit 111 predicts the future position of the drone DR (a step S21). For example, the position prediction unit 111 may predict the future position of the drone DR based on the position data x indicating the past position of the drone DR included in the past information 121. For example, the position prediction unit 111 may predict the future position of the drone DR based on the position data x indicating the past position of the drone DR included in the past information 121 and a current flying speed and flying direction of the drone DR. In this case, the information collection unit 116 may collect a flying information relating to the current flying speed and flying direction of the drone DR. For example, the position prediction unit 111 may predict the future position of the drone DR based on a past flying route (namely, flying trajectory) of the drone DR. In this case, the information collection unit 116 may collect the past flying route of the drone DR. For example, the position prediction unit 111 may predict the future position of the drone DR based on an information relating to a plurality of waypoints indicating a flying route of the drone DR. In this case, the information collection unit 116 may collect a waypoint information relating to the waypoint of the drone DR.

Figure 7:
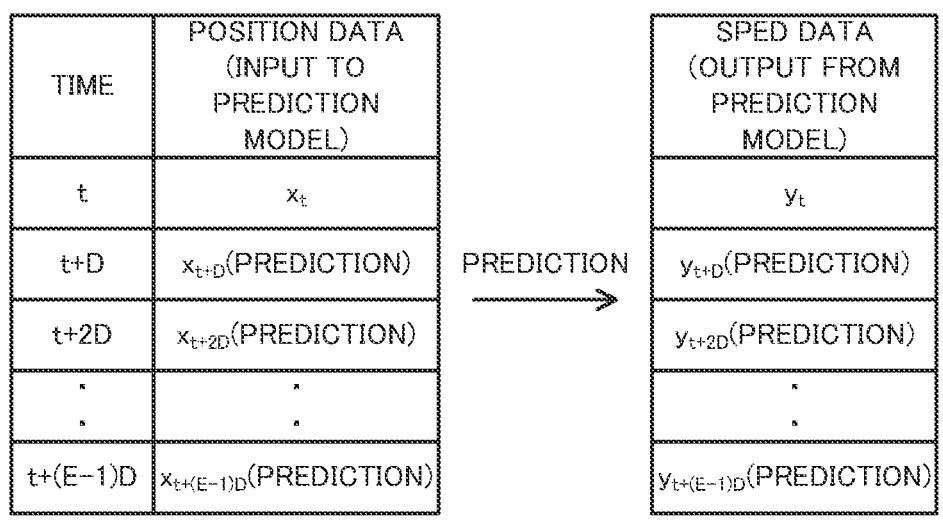
FIG. 7 is a table that illustrates position data inputted to the prediction model and speed data outputted from the prediction model.
Figure 8:
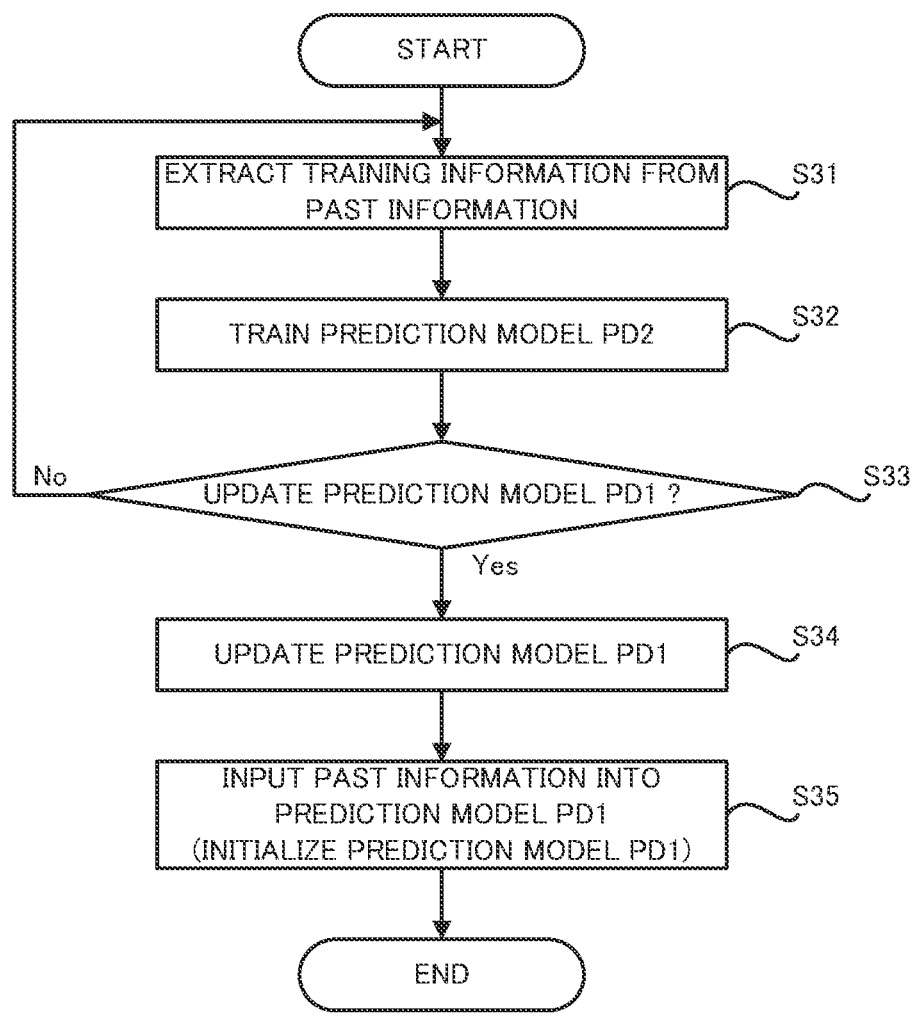
FIG. 8 is a flow chart that illustrates a flow of a continuous training operation that is a part of the communication speed prediction operation.

Then, the communication speed prediction unit 112 predicts the future communication speed between the drone DR and the ground base station BS by using the future position of the drone DR predicted at the step S21 and the prediction model PD1 (a step S22). For example, when the future communication speed between the drone DR and the ground base station BS from the current time t to a future time t+(E−1)D (note that E is an integer that is equal to or larger than 2) is predicted, the position prediction unit 111 predicts the position of the drone DR at least from the time t to the time t+(E−1)D at the step S21. In this case, the communication speed prediction unit 112 inputs the time-series data indicating the position of the drone DR from the time t to the time t+(E−1)D into the prediction model PD1. Specifically, as illustrated in FIG. 7, the communication speed prediction unit 112 inputs the position data $x_t$ indicating the position of the drone DR at the current time t, the position data $x_{t+D}$ indicating the position of the drone DR at the future time t+D, the position data $x_{t+2D}$ indicating the position of the drone DR at the future time t+2D, . . . , and the position data $x_{t+(E-1)D}$ indicating the position of the drone DR at the future time t+(E−1)D into the prediction model PD1. As a result, as illustrated in FIG. 7, the prediction model PD1 outputs the speed data $y_t$ indicating the communication speed between the drone DR and the ground base station BS at the current time t, the speed data $y_{t+D}$ indicating the communication speed between the drone DR and the ground base station BS at the future time t+D, the speed data $y_{t+2D}$ indicating the communication speed between the drone DR and the ground base station BS at the future time t+2D, . . . , and the speed data $y_{t+(E-1)D}$ indicating the communication speed between the drone DR and the ground base station BS at the future time t+(E−1)D, <2-3> Continuous Training Operation Next, with reference to FIG. 8, the flow of the continuous training operation will be described. FIG. 8 is a flowchart that illustrates the flow of the continuous training operation that is a part of the communication speed prediction operation.

Firstly, the training information extraction unit 113 extracts the training information from the past information 121 stored in the storage apparatus 12 (a step S31). Specifically, the training information extraction unit 113 extracts, as the training information, S sample information (namely, S positional data x and S speed data y that are associated with the S position data x) that correspond to sequential S times from the past information 121, as with the operation at the step S11 in the initial training operation. However, a method of extracting the training information at the step S31 is different from a method of extracting the training information at the step S11. Specifically, at the step S31, the training information extraction unit 113 extracts the S sample information based on a condition that the probability that each sample information included in the past information 121 is extracted as the training information changes based on the time corresponding to the sample information. Namely, the operation at the step S31 is different from the operation at the step S11 in which the probability that each sample information included in the past information 121 is extracted as the training information is constant (alternatively, a random) regardless of the time corresponding to the sample information in that the probability that each sample information included in the past information 121 is extracted as the training information changes based on the time corresponding to the sample information.

FIG. 9A and FIG. 9B illustrate the probability that each sample information included in the past information 121 is extracted as the training information. As illustrated in FIG. 9A and FIG. 9B, the training information extraction unit 113 extracts the training information based on a probability condition that a probability that the sample information collected at a second time, which is closer to the current time t than a first time is, is extracted as the training information is higher than or equal to (namely, is not lower than) a probability that the sample information collected at the first time is extracted as the training information. In this case, as illustrated in FIG. 9A, the training information extraction unit 113 may extract the training information based on a probability condition that the probability that the sample information is extracted as the training information is higher in a continuous manner as a time at which the sample information is collected is closer to the current time t. Namely, the training information extraction unit 113 may extract the training information based on a probability condition that the probability that the sample information is extracted as the training information is higher in a continuous manner as it is collected at a time closer to the current time t. Alternatively, as illustrated in FIG. 9B, the training information extraction unit 113 may extract the training information based on a probability condition that the probability that the sample information is extracted as the training information is higher in a stepwise manner as the time at which the sample information is collected is closer to the current time t. Namely, the training information extraction unit 113 may extract the training information based on a probability condition that the probability that the sample information is extracted as the training information is higher in a stepwise manner as it is collected at a time closer to the current time t.

In this case, the training extraction unit 113 may select the time t_start so as to satisfy the above described probability condition and extract the S sample information corresponding to the selected time t_start to the time t_start+(S−1)D, respectively, as the training information. In order to select the time t_start so as to satisfy the probability condition, the training information extraction unit 113 may select the time t_start so that a probability that the second time, which is closer to the current time t than the first time is, is selected as the time t_start is higher than or equal to (namely, is not lower than) a probability that the first time is selected as the time t_start. In order to select the time t_start so as to satisfy the probability condition, the training information extraction unit 113 may select the time t_start so that a probability that one time is selected as the time t_start is higher as one time is closer to the current time t.

Incidentally, when the time t_start is selected as described above, the training information extraction unit 113 may not select the current time t to a time t−(S−2)D as the time t_start. This is because there is a possibility that the training information extraction unit 113 is not capable of extracting the S sample information corresponding to the time t_start to a time t_start+(S−1)D from the past information 121 when the time from the current time t to the time t−(S−2)D is selected as the time t_start. Namely, this is because there is a possibility that the training information extraction unit 113 merely extracts, from the past information 121 as the training information, the sample information the number of which is smaller than S.

Again in FIG. 8, then, the model training unit 114 trains the prediction model PD2 based on the training information extracted at the step S31 (a step S32). Note that the operation at the step S32 in the continuous training operation may be same as the operation at the step S12 in the initial training operation, and thus, a detailed description thereof is omitted.

Then, the model update unit 115 determines whether or not the prediction model PD1 should be updated (a step S33). As a result of the determination at the step S33, when it is determined that the prediction model PD1 should be updated (the step S33: Yes), the model update unit 115 updates the prediction model PD1 by using the trained result by the model training unit 114 at the step S12 (namely, the trained parameter) (a step S34). Furthermore, the model update unit 115 initializes the prediction model PD1 updated as the step S34 (a step S35). Note that the operations at the steps S34 and S35 in the continuous training operation may be same as the operations at the steps S14 and S15 in the initial training operation, respectively, and thus, a detailed description thereof is omitted. On the other hand, as a result of the determination at the step S33, when it is determined that the prediction model PD1 should not be updated (the step S33: No), the model training unit 114 performs the operations at the steps S31 and S32 again. Namely, the training information extraction unit 113 newly extracts S sample information from the past information 121 as the training information, and trains the prediction model PD2 based on the newly extracted training information.

In the present example embodiment, at the step S33, the model update unit 115 determines whether or not the prediction model PD1 should be updated based on a predetermined update frequency information. The update frequency information is an information that designates a frequency at which the prediction model PD1 is updated by using the trained result of the prediction model PD2 (hereinafter, it is referred to as an "update frequency").

As the update frequency becomes lower, an update period that should elapse from a time at which the prediction model PD1 is updated last time to a time at which the prediction model PD1 is newly updated becomes longer. Thus, the update frequency information may be substantially an information that designates, as the update frequency, the update period that should elapse from the time at which the prediction model PD1 is updated last time to the time at which the prediction model PD1 is newly updated. In this case, when an time that actually elapses from the time at which the prediction model PD1 is updated last time is shorter than the update period designated by the update frequency information, the model update unit 115 may determine that the prediction model PD1 should not be updated yet. On the other hand, when the time that actually elapses from the time at which the prediction model PD1 is updated last time is longer than the update period designated by the update frequency information, the model update unit 115 may determine that the prediction model PD1 should be updated.

As the update frequency becomes longer, the number of updating the prediction model PD1 per unit time becomes smaller. Thus, the update frequency information may be substantially an information that designates, as the update frequency, the number of updating the prediction model PD1 per unit time. In this case, when a number of actually updating the prediction model PD1 per unit time is larger than the number of updating designated by the update frequency information, the model update unit 115 may determine that the prediction model PD1 should not be updated yet. On the other hand, when the number of actually updating the prediction model PD1 per unit time is smaller than the number of updating designated by the update frequency information, the model update unit 115 may determine that the prediction model PD1 should be updated.

Next, with reference to FIG. 10A to FIG. 12D, one example of the update frequency information will be described. Each of FIG. 10A to FIG. 12D illustrates one example of the update frequency of the prediction model PD1 designated by the update frequency information.

As illustrated in FIG. 10A to FIG. 10B, the update frequency information may be an information that designates the update frequency based on a processing performance of the communication speed prediction apparatus 1. Namely, the update frequency information may be an information that indicates a relationship between the processing performance of the communication speed prediction apparatus 1 and the update frequency. Specifically, the update frequency information may be an information for designating the update frequency satisfying a condition that the update frequency in a case where the processing performance of the communication speed prediction apparatus 1 is a second performance that is lower than a first performance is lower than the update frequency in a case where the processing performance of the communication speed prediction apparatus 1 is the first performance. For example, as illustrated in FIG. 10A, the update frequency information may be an information for designating the update frequency satisfying a condition that the update frequency decreases in a continuous manner as the processing performance of the communication speed prediction apparatus 1 is lower. For example, as illustrated in FIG. 10B, the update frequency information may be an information for designating the update frequency satisfying a condition that the update frequency decreases in a stepwise manner as the processing performance of the communication speed prediction apparatus 1 is lower.

In this case, the model update unit 115 determines the processing performance of the communication speed prediction apparatus 1, determines the update frequency based on the determined processing performance, and determines whether or not the prediction model PD1 should be updated based on the determined update frequency. Namely, the model update unit 115 changes the update frequency of the prediction model PD1 based on the processing performance of the communication speed prediction apparatus 1. As a result, the prediction model PD1 is less likely updated as the processing performance of the communication speed prediction apparatus 1 is lower. For example, the update period that should elapse until the prediction model PD1 is updated is longer and/or the number of updating the prediction model PD1 per unit time is smaller as the processing performance of the communication speed prediction apparatus 1 is lower. Moreover, the initialization of the prediction model PD1, which should be performed along with the update of the prediction model PD1, is less likely performed as the processing performance of the communication speed prediction apparatus 1 is lower. Namely, the communication speed prediction apparatus 1 having the relatively low processing performance does not necessarily perform the initialization of the prediction model PD1, the processing load of which is relatively high, at a relatively high frequency. As a result, even the communication apparatus such as the drone DR that is only allowed to be equipped with a CPU having the relatively low processing performance is capable of properly performing the continuous training operation because it does not necessarily perform the initialization of the prediction model PD1, the processing load of which is relatively high, at the relatively high frequency. Moreover, it can be said that the communication speed prediction apparatus 1 having the relatively low processing performance is capable of prioritizing the training of the prediction model PD2 over the initialization of the prediction model PD1 the processing load of which is relatively high. Namely, the communication speed prediction apparatus 1 having the relatively low processing performance is capable of prioritizing an improvement of the prediction accuracy of the prediction model PD1 in the future by performing the training of the prediction model PD2.

As illustrated in FIG. 11A to FIG. 11D, the update frequency information may be an information that designates the update frequency based on the prediction accuracy of the future communication speed by using the prediction model PD1. Namely, the update frequency information may be an information that indicates a relationship between the prediction accuracy of the future communication speed by using the prediction model PD1 and the update frequency. Specifically, the update frequency information may be an information for designating the update frequency satisfying a condition that the update frequency in a case where the prediction accuracy is a second accuracy that is higher than a first accuracy is lower than the update frequency in a case where the prediction accuracy is the first accuracy. For example, as illustrated in FIG. 11A, the update frequency information may be an information for designating the update frequency satisfying a condition that the update frequency decreases in a continuous manner as the prediction accuracy is higher. For example, as illustrated in FIG. 11B, the update frequency information may be an information for designating the update frequency satisfying a condition that the update frequency decreases in a stepwise manner as the prediction accuracy is higher. For example, as illustrated in FIG. 11C, the update frequency information may be an information for designating the update frequency satisfying a condition that the prediction model PD1 is updated at a certain update frequency in the case where the prediction accuracy is lower than a predetermined accuracy and the prediction model PD1 is not updated in the case where the prediction accuracy is higher than the predetermined accuracy. For example, as illustrated in FIG. 11D, the update frequency information may be an information for designating the update frequency satisfying a condition that the prediction model PD1 is updated at an update frequency, which decreases in a continuous manner (alternatively, in a stepwise manner) as the prediction accuracy is higher, in the case where the prediction accuracy is lower than the predetermined accuracy and the prediction model PD1 is not updated in the case where the prediction accuracy is higher than the predetermined accuracy.

In this case, the model update unit 115 calculates the prediction accuracy of the prediction model PD1, determines the update frequency based on the calculated prediction accuracy, and determines whether or not the prediction model PD1 should be updated based on the determined update frequency. Namely, the model update unit 115 changes the update frequency of the prediction model PD1 based on the prediction accuracy of the prediction model PD1. As a result, the prediction model PD1 is less likely updated as the prediction accuracy is higher. For example, the update period that should elapse until the prediction model PD1 is updated is longer and/or the number of updating the prediction model PD1 per unit time is smaller as the prediction accuracy is higher. Thus, the communication speed prediction unit 112 is more likely to keep using the prediction model PD1, which is used now, without change as the prediction accuracy is higher. Thus, the model update unit 115 does not necessarily update the prediction model PD1 that has a relatively small need for the update (namely, that causes no problem if it is used without change) because of the relatively high prediction accuracy. Namely, the model update unit 115 may not update the prediction model PD1 than necessary. Thus, the processing load of the CPU 11 that is required to update the prediction model PD1 is reduced. Moreover, it can be said that the communication speed prediction apparatus 1 is capable of prioritizing the training of the prediction model PD2 over the initialization of the prediction model PD1 the processing load of which is relatively high when the variation amount is relatively small. Namely, the communication speed prediction apparatus 1 is capable of prioritizing the improvement of the prediction accuracy of the prediction model PD1 in the future by performing the training of the prediction model PD2.

The model update unit 115 may calculate, as the prediction accuracy of the prediction model PD1, a difference between a communication speed at a certain time predicted by the prediction model PD1 and a communication speed at the same time collected by the information collection unit 116. Specifically, when the communication speed prediction unit 112 predicts the communication speed from the current time t to the time t+(E−1)D by using the prediction model PD1, the information collection unit 116 is capable of collecting, from at least one of the drone DR and the ground base station BS, the speed data y indicating the actual communication speed from the current time t to the time t+(E−1)D as time advances. Thus, the model update unit 115 is capable of calculating the difference between the communication speed at a certain time predicted by the prediction model PD1 and the communication speed at the same time collected by the information collection unit 116. It can be said that the prediction accuracy of the prediction model PD1 is higher as the difference is smaller.

Incidentally, it can be said that each of the processing performance of the communication speed prediction apparatus 1 and the prediction accuracy using the prediction model PD1 by the communication speed prediction apparatus 1 indicates a state of the communication speed prediction apparatus 1. Thus, the update frequency information may be an information that designates the update frequency based on the state of the communication speed prediction apparatus 1. Namely, the update frequency information may be an information that indicates a relationship between the state of the communication speed prediction apparatus 1 and the update frequency.

Figure 12A:
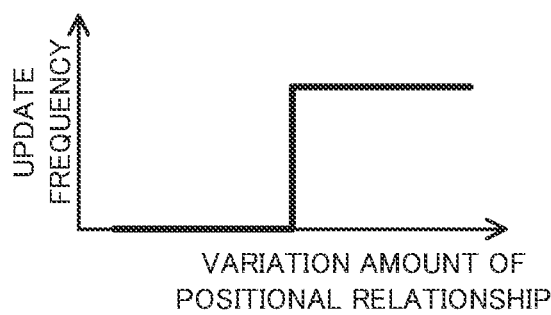
Figure 12B:
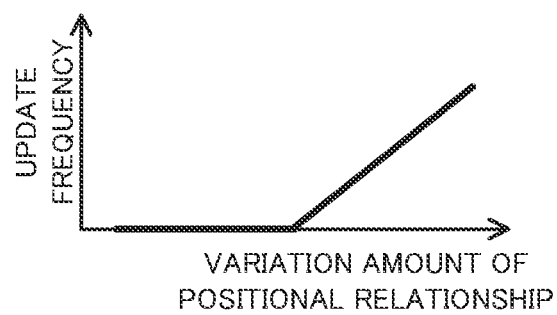
Figure 12C:
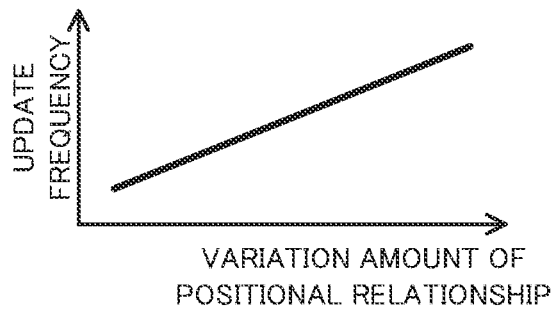
Figure 12D:
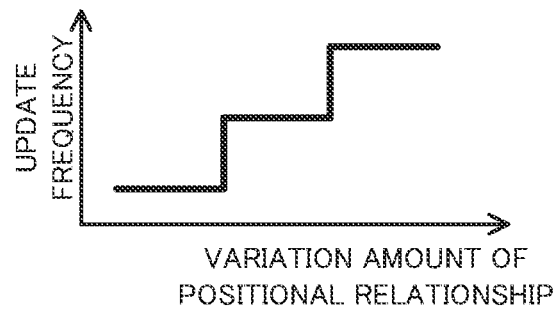

As illustrated in FIG. 12A to FIG. 12D, the update frequency information may be an information that designates the update frequency based on a variation amount of the relative positional relationship between the drone DR and the ground base station BS after the prediction model PD1 is updated last time. Namely, the update frequency information may be an information that indicates a relationship between the variation amount of the relative positional relationship between the drone DR and the ground base station BS after the prediction model PD1 is updated last time and the update frequency. Specifically, the update frequency information may be an information for designating the update frequency satisfying a condition that the update frequency in a case where the variation amount is a second amount that is smaller than a first amount is lower than the update frequency in a case where the variation amount is the first amount. For example, as illustrated in FIG. 12A, the update frequency information may be an information for designating the update frequency satisfying a condition that the prediction model PD1 is updated at a certain update frequency in the case where the variation amount is larger than a predetermined amount and the prediction model PD1 is not updated in the case where the variation amount is smaller than the predetermined amount. For example, as illustrated in FIG. 12B, the update frequency information may be an information for designating the update frequency satisfying a condition that the prediction model PD1 is updated at an update frequency, which decreases in a continuous manner (alternatively, in a stepwise manner) as the variation amount is smaller, in the case where the variation amount is larger than the predetermined amount and the prediction model PD1 is not updated in the case where the variation amount is smaller than the predetermined amount. For example, as illustrated in FIG. 12C, the update frequency information may be an information for designating the update frequency satisfying a condition that the update frequency decreases in a continuous manner as the variation amount is smaller. For example, as illustrated in FIG. 12D, the update frequency information may be an information for designating the update frequency satisfying a condition that the update frequency decreases in a stepwise manner as the variation amount is smaller. Note that a variation amount of a distance between the drone DR and the ground base station BS may be used as the variation amount of the relative positional relationship between the drone DR and the ground base station BS.

In this case, the model update unit 115 calculates the variation amount of the relative positional relationship between the drone DR and the ground base station BS after the prediction model PD1 is updated last time, determines the update frequency based on the calculated variation amount, and determines whether or not the prediction model PD1 should be updated based on the determined update frequency. Namely, the model update unit 115 changes the update frequency of the prediction model PD1 based on the variation amount of the relative positional relationship between the drone DR and the ground base station BS after the prediction model PD1 is updated last time. As a result, the prediction model PD1 is less likely updated as the variation amount is smaller. For example, the update period that should elapse until the prediction model PD1 is updated is longer and/or the number of updating the prediction model PD1 per unit time is smaller as the variation amount is smaller. Thus, the communication speed prediction unit 112 is more likely to keep using the prediction model PD1, which is used now, without change as the variation amount is smaller. Here, when the relative positional relationship between the drone DR and the ground base station BS is not changed much, there is a relatively small possibility that the prediction accuracy of the communication speed using the prediction model PD1 deteriorates even when the communication speed prediction unit 112 keeps using the prediction model PD1 that is used now without change. This is because the communication speed between the drone DR and the ground base station BS depends on the relative positional relationship between the drone DR and the ground base station BS (especially, the distance between the drone DR and the ground base station BS). Thus, the model update unit 115 does not necessarily update the prediction model PD1 that has a relatively small need for the update (namely, that causes no problem if it is used without change) because of the relatively small variation amount. Namely, the model update unit 115 may not update the prediction model PD1 than necessary. Thus, the processing load of the CPU 11 that is required to update the prediction model PD1 is reduced. Moreover, it can be said that the communication speed prediction apparatus 1 is capable of prioritizing the training of the prediction model PD2 over the initialization of the prediction model PD1 the processing load of which is relatively high when the prediction accuracy of the prediction model PD1 is relatively high. Namely, the communication speed prediction apparatus 1 is capable of prioritizing the improvement of the prediction accuracy of the prediction model PD1 in the future by performing the training of the prediction model PD2.

Incidentally, it can be said that the relative positional relationship between the drone DR and the ground base station BS indicates states of the drone DR and the ground base station BS. Thus, the update frequency information may be an information that designates the update frequency based on the states of the drone DR and the ground base station BS. Namely, the update frequency information may be an information that indicates a relationship between the states of the drone DR and the ground base station BS and the update frequency.

<3> Technical Effect of Communication Speed Prediction Apparatus 1

As described above, the communication speed prediction apparatus 1 in the present example embodiment is capable of properly predicting the future communication speed between the drone DR and the ground base station BS. Especially, the communication speed prediction apparatus 1 is capable of properly updating the prediction model PD that is used to predict the communication speed, and thus, predicting the communication speed with high accuracy, as described below.

Specifically, the communication speed prediction apparatus 1 performs the initial training operation for training the prediction model PD2 based on the position data x indicating the position of the actually flying drone DR and the speed data y indicating the actual communication speed between the drone DR and the ground base station BS before the future communication speed is actually predicted. Thus, the communication speed prediction apparatus 1 is capable of properly updating the prediction model PD1 by using the trained result of the prediction model PD2 by the initial training operation before the prediction operation using the prediction model PD1 is started. As a result, the communication speed prediction apparatus 1 is capable of performing the prediction operation for predicting the future communication speed between the drone DR and the ground base station BS by using the prediction model PD1 the prediction accuracy of which is improved by the initial training operation. Thus, there is a relatively low possibility that the communication speed prediction apparatus 1 predicts the future communication speed that is largely different from the actual communication speed.

Moreover, the communication speed prediction apparatus 1 performs the continuous training operation (what we call an online learning) for training the prediction model PD2 after the prediction operation is started. Thus, the communication speed prediction apparatus 1 is capable of properly updating the prediction model PD1 so as to reflect a status of the actual updated communication speed between the drone DR and the ground base station BS in the prediction model PD1. Thus, the communication speed prediction apparatus 1 is capable of maintaining the prediction accuracy of the future communication speed to a relatively higher accuracy, compared to a case where the prediction model PD2 is not trained (namely, the prediction model PD1 is not updated) after the prediction operation is started.

Moreover, the method of extracting the training information in the continuous training operation is different from the method of extracting the training information in the initial training operation. Specifically, in the continuous training operation, the probability that the sample information is extracted as the training information is higher as the time at which the sample information is collected is closer to the current time t. Thus, the communication speed prediction apparatus 1 is capable of training the prediction model PD2 by using the sample information that is collected at a relatively latest time. Here, when the prediction model PD uses the RNN, the prediction accuracy of the future communication speed by the prediction model PD that is trained by using the sample information collected at a relatively latest time is higher than the prediction accuracy of the future communication speed by the prediction model PD that is trained by using the sample information collected at a relatively old time, because of a characteristic thereof. This is because there is a relatively high possibility that the future communication speed after the current time t depends on the communication speed at the time that is relatively closer to the current time t. Thus, the communication speed prediction apparatus 1 is capable of maintaining the prediction accuracy of the future communication speed to a relatively higher accuracy, compared to a case where the prediction model PD is trained by using the sample information collected at a relatively old time. Namely, the communication speed prediction apparatus 1 is capable of properly updating the prediction model PD1 so as to maintain the prediction accuracy of the future communication speed to a relatively higher accuracy.

Note that FIG. 13 is a box plot that illustrates the prediction accuracy of the prediction model PD1 in the present example embodiment that is updated by using the trained result using the sample information collected at a relatively latest time, together with the prediction accuracy in an existing method of predicting the future communication speed. As illustrated in FIG. 13, the prediction accuracy of the prediction model PD1 in the present example embodiment is higher than the prediction accuracies of five existing method of predicting the future communication speed. Note that the existing method of predicting the future communication speed by using an OR (Online Regression) method is disclosed in [M. Asadpour et al., "Route or carry: Motion-driven packet forwarding in microaerial vehicle networks", IEEE Trans. Mobile Comput., Vol. 16, no. 3, pp. 843-856, 2016]. The existing method of predicting the future communication speed by using a SVR (Support Vector Regression) method is disclosed in [M. Mirza et al., "A machine learning approach to TCP throughput prediction", in ACM SIGMETRICS Perf. Eval. Rev., vol. 35, no. 1, pp. 97-108, 2007]. The existing method of predicting the future communication speed by using a SM (Stochastic Modeling) method is disclosed in [H. Yoshida et al., "Constructing Stochastic model of TCP throughput on basis of stationarity analysis", in Proc. IEEE Blobal Commun. Conf. (GLOVE-COM), pp. 1544-1550, 2013]. The existing method of predicting the future communication speed by using each of a MAM (Moving Arithmetic Mean) method and a MGM (Moving Geometric Mean) method is disclosed in [Y. Liu et al., "An empirical study of throughput prediction in mobile data networks", Proc. IEEE Blobal Commun. Conf. (GLOBECOM), pp. 1-6, 2015].

Furthermore, the communication speed prediction apparatus 1 is capable of changing the frequency at which the prediction model PD1 is updated by using the trained result of the prediction model PD2. Thus, the communication speed prediction apparatus 1 is capable of updating the prediction model PD1 at a proper update frequency that is determined based on at least one of the state of the communication speed prediction apparatus 1 and the states of the drone DR and the ground base station BS, as described above.

Moreover, when the upper limits of the number of the hidden layer H (namely, the layer number) and the number of the hidden node HN (namely, the hidden state number) of the prediction model PD2 are set, a structure of the prediction model PD is simpler than that of the prediction model in which the number of the hidden layer H and/or the number of the hidden node HN is larger than the upper limit. Thus, the processing load required to predict the communication speed by using the prediction model PD1, the processing load required to train the prediction model PD2 and the processing load required to update the prediction model PD1 are also reduced. Thus, even the communication speed prediction apparatus having the relatively low processing performance is capable of properly predicting the communication speed by using the prediction model PD1, properly training the prediction model PD2 and properly updating the prediction model PD1. As a result, even the communication apparatus such as the drone DR that is only allowed to be equipped with the CPU having the relatively low processing performance is capable of properly performing the communication speed prediction operation.

<4> Modified Example

Next, a modified example of the communication speed prediction apparatus 1 will be described.

<4-1> First Modified Example

In the first modified example, the communication speed prediction unit 112 is configured to predict a probability distribution (a probability density function) of the future communication speed based on a temporal variation of the past communication speed included in the past information 121, in addition to predicting the future communication speed between the drone DR and the ground base station BS by using the prediction model PD1 as described above, in the prediction operation. No that the communication speed prediction apparatus 1 may use an existing method as a method of predicting the probability distribution of the future communication speed. One example of the existing method is disclosed in the above described Patent Literature 4. Thus, a detailed description of the method of predicting the probability distribution of the future communication speed is omitted.

Furthermore, in the first modified example, the communication speed prediction unit 112 outputs, as a predicted result thereby, either one of a predicted result of the future communication speed by using the prediction model PD1 and the probability distribution of the future communication speed in the prediction operation. Namely, a state of the communication speed prediction unit 112 is set to be either one of a state in which the predicted result of the future communication speed by using the prediction model PD1 is outputted and a state in which the probability distribution of the future communication speed is outputted.

Next, with reference to FIG. 14, the prediction operation in the first modified example will be described. FIG. 14 is a flowchart that illustrates a flow of the prediction operation in the first modified example.

As illustrated in FIG. 14, even in the first modified example, the position prediction unit 111 predicts the future position of the drone DR (the step S21) and the communication speed prediction unit 112 predicts the future communication speed between the drone DR and the ground base station BS by using the future position of the drone DR predicted at the step S21 and the prediction model PD1 (the step S22). Furthermore, in parallel with, before or after the operations at the steps S21 and S22, the communication speed prediction unit 112 predicts the probability distribution of the future communication speed based on the temporal variation of the past communication speed included in the past information 121.

Then, the communication speed prediction unit 112 calculates a degree of difference between the predicted result of the future communication speed by using the prediction model PD1 and a predicted result of the probability distribution of the future communication speed (a step S42). For example, the communication speed prediction unit 112 may calculate, as the degree of difference, a difference between the communication speed at a future time t_future predicted by using the prediction model PD1 and a communication speed at the future time t_future indicated by the probability distribution of the future communication speed (for example, an upper limit value, a median value, a lower limit value or the like of the communication speed indicated by the probability distribution). For example, the communication speed prediction unit 112 may calculate the difference between the communication speed at the future time t_future predicted by using the prediction model PD1 and the communication speed at the future time t_future indicated by the probability distribution of the future communication speed for all future times at which the communication speed is predicted, and calculate, as the degree of difference, a total sum of absolute values of the calculated differences or a total sum of exponentiations of the absolute values of the calculated differences.

Then, the communication speed prediction unit 112 determines whether or not the degree of difference calculated at the step S42 is lower (alternatively, smaller) than a predetermined threshold value TH1 (the step S42).

As a result of the determination at the step S42, when it is determined that the degree of difference calculated at the step S42 is higher (alternatively, larger) than the threshold value TH1 (the step S42: No), the predicted result of the future communication speed by using the prediction model PD1 is relatively largely different from the predicted result of the probability distribution of the future communication speed. In this case, the communication speed prediction unit 112 determines that the prediction accuracy of the prediction model PD1 is not sufficiently high. This is because the predicted result of the future communication speed by using the prediction model PD1 is not relatively largely different from the predicted result of the probability distribution of the future communication speed if the prediction accuracy of the prediction model PD1 is sufficiently high. Thus, the threshold value TH1 is set to be a desired value that properly allows a state in which the prediction accuracy of the future communication speed by using the prediction model PD1 is relatively high to be distinguished from a state in which the prediction accuracy of the future communication speed by using the prediction model PD1 is relatively low based on the degree of difference between the predicted result of the future communication speed by using the prediction model PD1 and the predicted result of the probability distribution of the future communication speed. In this case, the communication speed prediction unit 112 outputs the probability distribution of the future communication speed as the predicted result by the communication speed prediction unit 112 (a step S45). Namely, the state of the communication speed prediction unit 112 is set to be the state in which the probability distribution of the future communication speed is outputted.

On the other hand, as a result of the determination at the step S42, when it is determined that the degree of difference calculated at the step S42 is lower (alternatively, smaller) than the threshold value TH1 (the step S42: Yes), the predicted result of the future communication speed by using the prediction model PD1 is close to the predicted result of the probability distribution of the future communication speed. In this case, the communication speed prediction unit 112 determines that the prediction accuracy of the prediction model PD1 is sufficiently high. Thus, the communication speed prediction unit 112 outputs the future communication speed predicted by using the prediction model PD1 as the predicted result by the communication speed prediction unit 112 (a step S44). Namely, the state of the communication speed prediction unit 112 is set to be the state in which the future communication speed predicted by using the prediction model PD1 is outputted.

However, even when it is determined that the degree of difference calculated at the step S42 is lower than the threshold value TH1, there is a possibility that the prediction accuracy of the prediction model PD1 is relatively worse. In this case, there is a possibility that the communication speed prediction unit 112 outputs the future communication speed predicted by using the prediction model PD1, the prediction accuracy of which is relatively low, as the predicted result by the communication speed prediction unit 112. Thus, the communication speed prediction unit 112 may calculate a degree of difference between the communication speed predicted by the prediction model PD1 and the actual communication speed collected by the information collection unit 116 before the future communication speed predicted by using the prediction model PD1 is actually outputted, even when it is determined that the degree of difference calculated at the step S42 is lower than the threshold value TH1 (a step S43). For example, the communication speed prediction unit 112 may calculate, as the degree of difference, a difference between the communication speed at a time t' predicted by using the prediction model PD1 and the communication speed at the time t' collected by the information collection unit 116. For example, the communication speed prediction unit 112 may calculate the difference between the communication speed at a time t' predicted by using the prediction model PD1 and the communication speed at the time t' collected by the information collection unit 116 for all future times at which the communication speed is predicted, and calculate, as the degree of difference, a total sum of absolute values of the calculated differences or a total sum of exponentiations of the absolute values of the calculated differences.

Then, the communication speed prediction unit 112 determines whether or not the degree of difference calculated at the step S43 is lower (alternatively, smaller) than a predetermined threshold value TH2 (the step S43).

As a result of the determination at the step S43, when it is determined that the degree of difference calculated at the step S43 is higher (alternatively, larger) than the threshold value TH3 (the step S43: No), it is estimated that the communication speed predicted by the prediction model PD1 is relatively largely different from the actual communication speed. In this case, the communication speed prediction unit 112 determines that the prediction accuracy of the prediction model PD1 is not sufficiently high. This is because communication speed predicted by the prediction model PD1 is not relatively largely different from the actual communication speed if the prediction accuracy of the prediction model PD1 is sufficiently high. Thus, the threshold value TH2 is set to be a desired value that properly allows a state in which the prediction accuracy of the future communication speed by using the prediction model PD1 is relatively high to be distinguished from a state in which the prediction accuracy of the future communication speed by using the prediction model PD1 is relatively low based on the degree of difference between the communication speed predicted by the prediction model PD1 and the actual communication speed. In this case, the communication speed prediction unit 112 outputs the probability distribution of the future communication speed as the predicted result by the communication speed prediction unit 112 (the step S45).

On the other hand, as a result of the determination at the step S43, when it is determined that the degree of difference calculated at the step S43 is lower (alternatively, smaller) than the threshold value TH2 (the step S43: Yes), the communication speed predicted by the prediction model PD1 is close to the actual communication speed. In this case, the communication speed prediction unit 112 determines that the prediction accuracy of the prediction model PD1 is sufficiently high. Thus, the communication speed prediction unit 112 outputs the future communication speed predicted by using the prediction model PD1 as the predicted result by the communication speed prediction unit 112 (the step S44). Namely, the state of the communication speed prediction unit 112 is set to be the state in which the future communication speed predicted by using the prediction model PD1 is outputted.

However, the communication speed prediction unit 112 may not perform the operation at the step S43. Namely, the communication speed prediction unit 112 may output the future communication speed predicted by using the prediction model PD1 as the predicted result by the communication speed prediction unit 112 when it is determined that the degree of difference calculated at the step S42 is lower than the threshold value TH1.

In the first modified example described above, an effect that is same as an effect achievable by the above described communication speed prediction apparatus 1 is achievable. Furthermore, in the first modified example, the communication speed prediction unit 112 is capable of outputting, as the predicted result by the communication speed prediction unit 112, the probability distribution of the future communication speed predicted based on the past information 121, even when the prediction accuracy of the prediction model PD1 is relatively low. Especially, when the method of predicting the probability distribution of the future communication speed is used, the communication speed prediction unit 112 is capable of predicting the probability distribution of the future communication speed with relatively high accuracy if the speed data y indicating the communication speed in a period of approximately the past several seconds to dozen seconds. Therefore, the communication speed prediction unit 112 is capable of predicting the probability distribution of the future communication speed with relatively high accuracy without much delay after the drone DR starts to fly. On the other hand, when the method of predicting the future communication speed by using the prediction model PD1 is used, the communication speed prediction unit 112 needs several minutes to dozen minutes for the training of the prediction model PD1. This is a reason why the communication speed prediction unit 112 performs the initial training operation without performing the prediction operation before the predetermined time elapses from the time at which the communication speed prediction operation is started. However, in the first modified example, the communication speed prediction unit 112 is capable of outputting, as the predicted result by the communication speed prediction unit 112, the probability distribution of the future communication speed, which is predicted based on the past information 121, during a period when the initial operation is performed. Namely, the communication speed prediction unit 112 is capable of outputting, as the predicted result by the communication speed prediction unit 112, the probability distribution of the future communication speed, which is predicted based on the past information 121, before the predetermined time elapses from the time at which the communication speed prediction operation is started. Thus, a time that is required to start outputting the predicted result of the future communication speed is reduced. On the other hand, after the initial training operation is completed (namely, after the predetermined time elapses from the time at which the communication speed prediction operation is started), it is estimated that the prediction model PD1 is sufficiently trained. Thus, the communication speed prediction unit 112 is capable of outputting, as the predicted result by the communication speed prediction unit 112, the future communication speed, which is predicted by using the prediction model PD1, after the initial training operation is completed (namely, after the predetermined time elapses from the time at which the communication speed prediction operation is started). Namely, the communication speed prediction unit 112 is capable of outputting the predicted result that indicates the future communication speed more accurately or more clearly than the probability distribution.

<4-2> Other Modified Example

In the above described description, the method of extracting the training information in the continuous training operation is different from the method of extracting the training information in the initial training operation. However, the method of extracting the training information in the continuous training operation may be same as the method of extracting the training information in the initial training operation. In the initial training operation, the training information extraction unit 113 may extract the S sample information based on the condition that the probability that each sample information included in the past information 121 is extracted as the training information changes based on the time corresponding to the sample information. In the continuous training operation, the training information extraction unit 113 may extract the S sample information based on the condition that the probability that each sample information included in the past information 121 is extracted as the training information is constant (alternatively, a random) regardless of the time corresponding to the sample information.

In the above described training operation, the model update unit 115 determines whether or not the prediction model PD1 should be updated based on the update frequency information. However, the model update unit 115 may not determine whether or not the prediction model PD1 should be updated based on the update frequency information. The model update unit 115 may determine whether or not the prediction model PD1 should be updated based on an information that is different from the update frequency information. The model update unit 115 may update the prediction model PD1 ever time the prediction model PD2 is trained. The model update unit 115 may not change the update frequency of the prediction model PD1.

<5> Supplementary Note

With respect to the example embodiments described above, the following Supplementary Notes will be further disclosed.

[Supplementary Note 1]

A communication speed prediction apparatus configured to predict a future communication speed between a first communication apparatus and a second communication apparatus that is capable of relatively move to the first communication apparatus,
  the communication speed prediction apparatus including:
  a position prediction unit configured to predict a future relative positional relationship between the first and second communication apparatuses;
  a speed prediction unit configured to predict the future communication speed between the first and second communication apparatuses by using a predicted result by the position prediction unit and a prediction model that is for predicting the future communication speed between the first and second communication apparatuses based on the relative positional relationship between the first and second communication apparatuses;
  an extraction unit configured to extract, from an information source that includes a plurality of sample information in each of which a past position information relating to a past relative positional relationship between the first and second communication apparatuses is associated with a past speed information relating to a past communication speed between the first and second communication apparatuses, at least one sample information as a training information for training the prediction model;
  a training unit configured to train a parameter of the prediction model by using the training information; and
  a model update unit configured to update, by using the parameter trained by the training unit, the prediction model used by the speed prediction unit,
  the model update unit being configured to change, based on at least one of a state of the communication speed prediction apparatus and a state of the first and second communication apparatuses, an update frequency by which the prediction model is updated.

[Supplementary Note 2]

The communication speed prediction apparatus according to Supplementary Note 1, wherein
  the state of the communication speed prediction apparatus includes a processing performance of the communication speed prediction apparatus.

[Supplementary Note 3]

The communication speed prediction apparatus according to Supplementary Note 2, wherein
  the model update unit is configured to update the update frequency so that the update frequency in a case where the processing performance is a second performance that is lower than a first performance is lower than the update frequency in a case where the processing performance is the first performance.

[Supplementary Note 4]

The communication speed prediction apparatus according to any one of Supplementary Notes 1 to 3, wherein
  the state of the communication speed prediction apparatus includes a prediction accuracy of the communication speed using the prediction model by the communication speed prediction apparatus.

[Supplementary Note 5]

The communication speed prediction apparatus according to Supplementary Note 4, wherein
  the model update unit is configured to update the update frequency so that the update frequency in a case where the prediction accuracy is a second accuracy that is higher than a first accuracy is lower than the update frequency in a case where the prediction accuracy is the first accuracy.

[Supplementary Note 6]

The communication speed prediction apparatus according to Supplementary Note 4 or 5, wherein
  the model update unit is configured to update the update frequency so that the prediction model is not updated when the prediction accuracy is higher than a predetermined accuracy.

[Supplementary Note 7]

The communication speed prediction apparatus according to any one of Supplementary Notes 1 to 6, wherein
  the state of the first and second communication apparatuses includes a variation amount of the relative positional relationship between the first and second communication apparatuses after the prediction model is updated last time.

[Supplementary Note 8]

The communication speed prediction apparatus according to Supplementary Note 7, wherein
  the model update unit is configured to update the update frequency so that the prediction model is not updated when the variation amount is smaller than a predetermined amount and the prediction model is updated when the variation amount is larger than the predetermined amount.

[Supplementary Note 9]

The communication speed prediction apparatus according to any one of Supplementary Notes 1 to 8, wherein
  in a first period, the training unit trains the parameter and the speed prediction unit does not predict the future communication speed between the first and the second communication apparatuses,
  in a second period that is different from the first period, the training unit trains the parameter and the speed prediction unit predicts the future communication speed between the first and the second communication apparatuses,
  a method of extracting the training information by the extraction unit in the first period is different from a method of extracting the training information by the extraction unit in the second period.

[Supplementary Note 10]

A communication speed prediction apparatus configured to predict a future communication speed between a first communication apparatus and a second communication apparatus that is capable of relatively move to the first communication apparatus,
  the communication speed prediction apparatus including:
  a position prediction unit configured to predict a future relative positional relationship between the first and second communication apparatuses;
  a speed prediction unit configured to predict the future communication speed between the first and second communication apparatuses by using a predicted result by the position prediction unit and a prediction model that is for predicting the future communication speed between the first and second communication apparatuses based on the relative positional relationship between the first and second communication apparatuses;

an extraction unit configured to extract, from an information source that includes a plurality of sample information in each of which a past position information relating to a past relative positional relationship between the first and second communication apparatuses is associated with a past speed information relating to a past communication speed between the first and second communication apparatuses, at least one sample information as a training information for training the prediction model;

a training unit configured to train a parameter of the prediction model by using the training information; and a model update unit configured to update, by using the parameter trained by the training unit, the prediction model used by the speed prediction unit, in a first period, the training unit training the parameter and the speed prediction unit not predicting the future communication speed between the first and the second communication apparatuses, in a second period that is different from the first period, the training unit training the parameter and the speed prediction unit predicting the future communication speed between the first and the second communication apparatuses, a method of extracting the training information by the extraction unit in the first period being different from a method of extracting the training information by the extraction unit in the second period.

[Supplementary Note 11]

The communication speed prediction apparatus according to Supplementary Note 9 or 10, wherein in the first period, the extraction unit extracts, as the training information, at least one sample information that is randomly extracted, in the second period, the extraction unit extracts the training information based on a condition that a probability that the sample information collected at a second time, which is closer to a current time than a first time is, is extracted as a part of the training information is higher than or equal to a probability that the sample information collected at the first time is extracted as a part of the training information.

[Supplementary Note 12]

The communication speed prediction apparatus according to any one of Supplementary Notes 9 to 11, wherein in the first period, the extraction unit extracts, as the training information, at least one sample information that is randomly extracted, in the second period, the extraction unit extracts the training information based on a condition that a probability that the sample information is extracted as a part of the training information is higher or equal as it is collected at a time closer to a current time.

[Supplementary Note 13]

The communication speed prediction apparatus according to any one of Supplementary Notes 1 to 12, wherein the speed prediction unit is configured to predict a probability distribution of the future communication speed between the first and second communication apparatuses by using a past communication speed between the first and second communication apparatuses, a state of the speed prediction unit is set to be a first state in which the future communication speed predicted by using the prediction model is outputted as a predicted result or a second state in which the probability distribution is outputted as the predicted result.

[Supplementary Note 14]

The communication speed prediction apparatus according to Supplementary Note 13, wherein the state of the speed prediction unit is set to be the first state or the second state based on an accuracy information relating to a prediction accuracy by the prediction model.

[Supplementary Note 15]

The communication speed prediction apparatus according to Supplementary Note 14, wherein the accuracy information includes at least one of an information relating to a degree of difference between the communication speed predicted by using the prediction model and an actual communication speed and an information relating to a degree of difference between the communication speed predicted by using the prediction model and a communication speed indicated by the probability distribution.

[Supplementary Note 16]

The communication speed prediction apparatus according to Supplementary Note 15, wherein the state of the speed prediction unit is set to be the first state when the degree of difference indicated by the accuracy information is lower than a predetermined threshold value, the state of the speed prediction unit is set to be the second state when the degree of difference indicated by the accuracy information is higher than the predetermined threshold value.

[Supplementary Note 17]

The communication speed prediction apparatus according to any one of Supplementary Notes 13 to 16, wherein the state of the speed prediction unit is set to be the first state in a first period and is set to be the second state in a second period that is different from the first period.

[Supplementary Note 18]

The communication speed prediction apparatus according to any one of Supplementary Notes 9 to 12 and 17, wherein the first period is a period before a predetermined time elapses from a time at which the training unit starts a training of the parameter, the second period is a period after the predetermined time elapses from the time at which the training unit starts a training of the parameter

[Supplementary Note 19]

The communication speed prediction apparatus according to any one of Supplementary Notes 1 to 18, wherein the communication speed prediction apparatus is built into at least one of the first and second communication apparatuses.

[Supplementary Note 20]

A communication speed prediction method of predicting a future communication speed between a first communication apparatus and a second communication apparatus that is capable of relatively move to the first communication apparatus, the communication speed prediction method including:

predicting a future relative positional relationship between the first and second communication apparatuses;

predicting the future communication speed between the first and second communication apparatuses by using a predicted result by the position prediction unit and a prediction model that is for predicting the future communication speed between the first and second communication apparatuses based on the relative positional relationship between the first and second communication apparatuses;
extracting, from an information source that includes a plurality of sample information in each of which a past position information relating to a past relative positional relationship between the first and second communication apparatuses is associated with a past speed information relating to a past communication speed between the first and second communication apparatuses, at least one sample information as a training information for training the prediction model;
training a parameter of the prediction model by using the training information:
updating, by using the trained parameter, the prediction model that is used to predict the future communication speed between the first and second communication apparatuses; and
changing, based on at least one of a state of the communication speed prediction apparatus and a state of the first and second communication apparatuses, an update frequency by which the prediction model is updated.

[Supplementary Note 21]

A communication speed prediction method of predicting a future communication speed between a first communication apparatus and a second communication apparatus that is capable of relatively move to the first communication apparatus, the communication speed prediction method including:
predicting a future relative positional relationship between the first and second communication apparatuses;
predicting the future communication speed between the first and second communication apparatuses by using a predicted result by the position prediction unit and a prediction model that is for predicting the future communication speed between the first and second communication apparatuses based on the relative positional relationship between the first and second communication apparatuses;
extracting, from an information source that includes a plurality of sample information in each of which a past position information relating to a past relative positional relationship between the first and second communication apparatuses is associated with a past speed information relating to a past communication speed between the first and second communication apparatuses, at least one sample information as a training information for training the prediction model;
training a parameter of the prediction model by using the training information; and
updating, by using the trained parameter, the prediction model that is used to predict the future communication speed between the first and second communication apparatuses,
in a first period, the parameter being trained and the future communication speed between the first and the second communication apparatuses being not predicted,
in a second period that is different from the first period, the parameter being trained and the future communication speed between the first and the second communication apparatuses being trained,
a method of extracting the training information in the first period being different from a method of extracting the training information in the second period.

[Supplementary Note 22]

A recording medium on which a computer program allowing a computer to execute a communication speed prediction method of predicting a future communication speed between a first communication apparatus and a second communication apparatus that is capable of relatively move to the first communication apparatus, the communication speed prediction method including:
predicting a future relative positional relationship between the first and second communication apparatuses;
predicting the future communication speed between the first and second communication apparatuses by using a predicted result by the position prediction unit and a prediction model that is for predicting the future communication speed between the first and second communication apparatuses based on the relative positional relationship between the first and second communication apparatuses;
extracting, from an information source that includes a plurality of sample information in each of which a past position information relating to a past relative positional relationship between the first and second communication apparatuses is associated with a past speed information relating to a past communication speed between the first and second communication apparatuses, at least one sample information as a training information for
training the prediction model;
training a parameter of the prediction model by using the training information:
updating, by using the trained parameter, the prediction model that is used to predict the future communication speed between the first and second communication apparatuses; and
changing, based on at least one of a state of the communication speed prediction apparatus and a state of the first and second communication apparatuses, an update frequency by which the prediction model is updated.

[Supplementary Note 23]

A recording medium on which a computer program allowing a computer to execute a communication speed prediction method of predicting a future communication speed between a first communication apparatus and a second communication apparatus that is capable of relatively move to the first communication apparatus, the communication speed prediction method including:
predicting a future relative positional relationship between the first and second communication apparatuses;
predicting the future communication speed between the first and second communication apparatuses by using a predicted result by the position prediction unit and a prediction model that is for predicting the future communication speed between the first and second communication apparatuses based on the relative positional relationship between the first and second communication apparatuses;
extracting, from an information source that includes a plurality of sample information in each of which a past position information relating to a past relative positional relationship between the first and second communication apparatuses is associated with a past speed information relating to a past communication speed between the first and second communication apparatuses, at least one sample information as a training information for training the prediction model;

training a parameter of the prediction model by using the training information; and updating, by using the trained parameter, the prediction model that is used to predict the future communication speed between the first and second communication apparatuses, in a first period, the parameter being trained and the future communication speed between the first and the second communication apparatuses being not predicted, in a second period that is different from the first period, the parameter being trained and the future communication speed between the first and the second communication apparatuses being trained, a method of extracting the training information in the first period being different from a method of extracting the training information in the second period.

The present invention is allowed to be changed, if desired, without departing from the essence or spirit of the invention which can be read from the claims and the entire specification, and a communication speed prediction apparatus, a communication speed prediction method and a recording medium, which involve such changes, are also intended to be within the technical scope of the present invention.

DESCRIPTION OF REFERENCE CODES 1 communication speed prediction apparatus
11 CPU
111 position prediction unit
112 communication speed prediction unit
113 training information extraction unit
114 model training unit
115 model updating unit
12 storage apparatus
121 past information
DR drone
BS ground base station

The invention claimed is:

1. A communication speed prediction apparatus for predicting a future communication speed between a first communication apparatus and a second communication apparatus that is to move relative to the first communication apparatus,
the communication speed prediction apparatus comprising:
at least one processor; and
at least one memory storing instructions executed by the at least one processor to:
predict a future relative positional relationship between the first and second communication apparatuses;
predict the future communication speed between the first and second communication apparatuses by using a predicted result of the future relative positional relationship and a prediction model that is for predicting the future communication speed between the first and second communication apparatuses based on the relative positional relationship between the first and second communication apparatuses;
extract, from an information source that includes a plurality of sample information in each of which a past position information relating to a past relative positional relationship between the first and second communication apparatuses is associated with a past speed information relating to a past communication speed between the first and second communication apparatuses, at least one sample information as a training information for training the prediction model;

train a parameter of the prediction model by using the training information;
update, by using the trained parameter, the prediction model used to predict the future communication speed between the first and second communication apparatuses; and
change, based on at least one of a state of the communication speed prediction apparatus and a state of the first and second communication apparatuses, an update frequency by which the prediction model is updated.

2. The communication speed prediction apparatus according to claim 1, wherein
the state of the communication speed prediction apparatus includes a processing performance of the communication speed prediction apparatus.

3. The communication speed prediction apparatus according to claim 2, wherein
the instructions are executed by the at least one processor to update the update frequency so that the update frequency in a case where the processing performance is a second performance that is lower than a first performance is lower than the update frequency in a case where the processing performance is the first performance.

4. The communication speed prediction apparatus according to claim 1, wherein
the state of the communication speed prediction apparatus includes a prediction accuracy of the communication speed using the prediction model by the communication speed prediction apparatus.

5. The communication speed prediction apparatus according to claim 4, wherein
the instructions are executed by the at least one processor to update the update frequency so that the update frequency in a case where the prediction accuracy is a second accuracy that is higher than a first accuracy is lower than the update frequency in a case where the prediction accuracy is the first accuracy.

6. The communication speed prediction apparatus according to claim 4, wherein
the instructions are executed by the at least one processor to update the update frequency so that the prediction model is not updated when the prediction accuracy is higher than a predetermined accuracy.

7. The communication speed prediction apparatus according to claim 1, wherein
the state of the first and second communication apparatuses includes a variation amount of the relative positional relationship between the first and second communication apparatuses after the prediction model is updated last time.

8. The communication speed prediction apparatus according to claim 7, wherein
the instructions are executed by the at least one processor to update the update frequency so that the prediction model is not updated when the variation amount is smaller than a predetermined amount and the prediction model is updated when the variation amount is larger than the predetermined amount.

9. The communication speed prediction apparatus according to claim 1, wherein
in a first period, the instructions are executed by the at least one processor to train the parameter and not to predict the future communication speed between the first and the second communication apparatuses,
in a second period that is different from the first period, the instructions are executed by the at least one processor to train the parameter and to predict the future communication speed between the first and the second communication apparatuses, and the instructions are executed by the at least one processor to extract the training information differently in the first period than in the second period.

10. A communication speed prediction apparatus for predicting a future communication speed between a first communication apparatus and a second communication apparatus that is to move relative to the first communication apparatus, the communication speed prediction apparatus comprising:

at least one processor; and at least one memory storing instructions executed by the at least one processor to predict a future relative positional relationship between the first and second communication apparatuses;

predict the future communication speed between the first and second communication apparatuses by using a predicted result of the future relative positional relationship and a prediction model that is for predicting the future communication speed between the first and second communication apparatuses based on the relative positional relationship between the first and second communication apparatuses;

extract, from an information source that includes a plurality of sample information in each of which a past position information relating to a past relative positional relationship between the first and second communication apparatuses is associated with a past speed information relating to a past communication speed between the first and second communication apparatuses, at least one sample information as a training information for training the prediction model;

train a parameter of the prediction model by using the training information; and update, by using the trained parameter, the prediction model used to predict the future communication speed between the first and second communication apparatuses, in a first period, the instructions are executed by the at least one processor to train the parameter and not to predict the future communication speed between the first and the second communication apparatuses, in a second period that is different from the first period, the instructions are executed by the at least one processor to train the parameter and to predict the future communication speed between the first and the second communication apparatuses, and the instructions are executed by the at least one processor to extract the training information differently in the first period than in the second period.

11. The communication speed prediction apparatus according to claim 10, wherein in the first period, the instructions are executed by the at least one processor to extract, as the training information, at least one sample information that is randomly extracted, in the second period, the instructions are executed by the at least one processor to extract the training information based on a condition that a probability that the sample information collected at a second time, which is closer to a current time than a first time is, is extracted as a part of the training information is higher than or equal to a probability that the sample information collected at the first time is extracted as a part of the training information.

12. The communication speed prediction apparatus according to claim 10, wherein in the first period, the instructions are executed by the at least one processor to extract, as the training information, at least one sample information that is randomly extracted, in the second period, the instructions are executed by the at least one processor to extract the training information based on a condition that a probability that the sample information is extracted as a part of the training information is higher as it is collected at a time closer to a current time.

13. The communication speed prediction apparatus according to claim 1, wherein the instructions are executed by the at least one processor to execute the instructions to predict a probability distribution of the future communication speed between the first and second communication apparatuses by using a past communication speed between the first and second communication apparatuses, a state of the at least one processor is set to be a first state in which the future communication speed predicted by using the prediction model is outputted as a predicted result or a second state in which the probability distribution is outputted as the predicted result.

14. The communication speed prediction apparatus according to claim 13, wherein the state of the at least one processor is set to be the first state or the second state based on an accuracy information relating to a prediction accuracy by the prediction model.

15. The communication speed prediction apparatus according to claim 14, wherein the accuracy information includes at least one of an information relating to a degree of difference between the communication speed predicted by using the prediction model and an actual communication speed and an information relating to a degree of difference between the communication speed predicted by using the prediction model and a communication speed indicated by the probability distribution.

16. The communication speed prediction apparatus according to claim 15, wherein the state of the at least one processor is set to be the first state when the degree of difference indicated by the accuracy information is lower than a predetermined threshold value, the state of the at least one processor is set to be the second state when the degree of difference indicated by the accuracy information is higher than the predetermined threshold value.

17. The communication speed prediction apparatus according to claim 13, wherein the state of the at least one processor is set to be the first state in a first period and is set to be the second state in a second period that is different from the first period.

18. The communication speed prediction apparatus according to claim 10, wherein the first period is a period before a predetermined time elapses from a time at which the at least one processor starts to train the parameter, the second period is a period after the predetermined time elapses from the time at which the at least one processor starts to train the parameter.

19. The communication speed prediction apparatus according to claim 1, wherein
the communication speed prediction apparatus is built into at least one of the first and second communication apparatuses.

20. A communication speed prediction method performed by a communication speed prediction apparatus for predicting a future communication speed between a first communication apparatus and a second communication apparatus that is to move relative to the first communication apparatus, the communication speed prediction method comprising:
predicting a future relative positional relationship between the first and second communication apparatuses;
predicting the future communication speed between the first and second communication apparatuses by using a predicted result of the future relative positional relationship and a prediction model that is for predicting the future communication speed between the first and second communication apparatuses based on the relative positional relationship between the first and second communication apparatuses;
extracting, from an information source that includes a plurality of sample information in each of which a past position information relating to a past relative positional relationship between the first and second communication apparatuses is associated with a past speed information relating to a past communication speed between the first and second communication apparatuses, at least one sample information as a training information for training the prediction model;
training a parameter of the prediction model by using the training information;
updating, by using the trained parameter, the prediction model that is used to predict the future communication speed between the first and second communication apparatuses; and
changing, based on at least one of a state of the communication speed prediction apparatus and a state of the first and second communication apparatuses, an update frequency by which the prediction model is updated.

21. A communication speed prediction method performed by a communication speed prediction apparatus for predicting a future communication speed between a first communication apparatus and a second communication apparatus that is to move relative to the first communication apparatus, the communication speed prediction method comprising:
predicting a future relative positional relationship between the first and second communication apparatuses;
predicting the future communication speed between the first and second communication apparatuses by using a predicted result of the future relative positional relationship and a prediction model that is for predicting the future communication speed between the first and second communication apparatuses based on the relative positional relationship between the first and second communication apparatuses;
extracting, from an information source that includes a plurality of sample information in each of which a past position information relating to a past relative positional relationship between the first and second communication apparatuses is associated with a past speed information relating to a past communication speed between the first and second communication apparatuses, at least one sample information as a training information for training the prediction model;
training a parameter of the prediction model by using the training information; and
updating, by using the trained parameter, the prediction model that is used to predict the future communication speed between the first and second communication apparatuses,
in a first period, the parameter is trained and the future communication speed between the first and the second communication apparatuses is not predicted,
in a second period that is different from the first period, the parameter is trained and the future communication speed between the first and the second communication apparatuses is trained, and
the training information is extracted in the first period differently than in the second period.

22. A non-transitory recording medium storing a computer program executed by a communication speed prediction apparatus to perform a communication speed prediction method for predicting a future communication speed between a first communication apparatus and a second communication apparatus that is to move relative to the first communication apparatus,
the communication speed prediction method comprising:
predicting a future relative positional relationship between the first and second communication apparatuses;
predicting the future communication speed between the first and second communication apparatuses by using a predicted result of the future relative positional relationship and a prediction model that is for predicting the future communication speed between the first and second communication apparatuses based on the relative positional relationship between the first and second communication apparatuses;
extracting, from an information source that includes a plurality of sample information in each of which a past position information relating to a past relative positional relationship between the first and second communication apparatuses is associated with a past speed information relating to a past communication speed between the first and second communication apparatuses, at least one sample information as a training information for training the prediction model;
training a parameter of the prediction model by using the training information;
updating, by using the trained parameter, the prediction model that is used to predict the future communication speed between the first and second communication apparatuses; and
changing, based on at least one of a state of the communication speed prediction apparatus and a state of the first and second communication apparatuses, an update frequency by which the prediction model is updated.

23. A non-transitory recording medium storing a computer program executed by communication speed prediction apparatus to perform execute a communication speed prediction method for predicting a future communication speed between a first communication apparatus and a second communication apparatus that is to move relative to the first communication apparatus,
the communication speed prediction method comprising:
predicting a future relative positional relationship between the first and second communication apparatuses;
predicting the future communication speed between the first and second communication apparatuses by using a predicted result of the future relative positional relationship and a prediction model that is for predicting the future communication speed between the first and second communication apparatuses based on the relative positional relationship between the first and second communication apparatuses;

extracting, from an information source that includes a plurality of sample information in each of which a past position information relating to a past relative positional relationship between the first and second communication apparatuses is associated with a past speed information relating to a past communication speed between the first and second communication apparatuses, at least one sample information as a training information for training the prediction model;

training a parameter of the prediction model by using the training information; and updating, by using the trained parameter, the prediction model that is used to predict the future communication speed between the first and second communication apparatuses, in a first period, the parameter is trained and the future communication speed between the first and the second communication apparatuses is not predicted, in a second period that is different from the first period, the parameter is trained and the future communication speed between the first and the second communication apparatuses is trained, and the training information is extracted in the first period differently than in the second period.

\* \* \* \* \*